US011633664B2

(12) United States Patent
Kira et al.

(10) Patent No.: US 11,633,664 B2
(45) Date of Patent: Apr. 25, 2023

(54) NON-TRANSITORY STORAGE MEDIUM HAVING STORED THEREIN GAME PROGRAM, GAME APPARATUS, GAME SYSTEM, AND GAME METHOD

(71) Applicant: NINTENDO CO., LTD., Kyoto (JP)

(72) Inventors: Satoshi Kira, Kyoto (JP); Yoshihito Ikebata, Kyoto (JP); Bryce Holliday, Vancouver (CA); Christopher Rice, Vancouver (CA); Jeffrie Wu, Vancouver (CA)

(73) Assignee: NINTENDO CO., LTD., Kyoto (JP)

( * ) Notice: Subject to any disclaimer, the term of this patent is extended or adjusted under 35 U.S.C. 154(b) by 47 days.

(21) Appl. No.: 16/595,936

(22) Filed: Oct. 8, 2019

(65) Prior Publication Data

US 2020/0269129 A1 Aug. 27, 2020

(30) Foreign Application Priority Data

Feb. 27, 2019 (JP) .............................. JP2019-033786

(51) Int. Cl.
*A63F 13/23* (2014.01)
*A63F 13/95* (2014.01)
(Continued)

(52) U.S. Cl.
CPC .............. *A63F 13/23* (2014.09); *A63F 13/24* (2014.09); *A63F 13/26* (2014.09); *A63F 13/58* (2014.09); *A63F 13/95* (2014.09)

(58) Field of Classification Search
CPC .......... A63F 13/23; A63F 13/24; A63F 13/26; A63F 13/285; A63F 2300/8088
See application file for complete search history.

(56) References Cited

U.S. PATENT DOCUMENTS 4,738,451 A * 4/1988 Logg ....................... A63F 13/48
463/2
7,559,834 B1 * 7/2009 York ....................... A63F 13/10
463/2
(Continued)

FOREIGN PATENT DOCUMENTS

| JP | 2002-035421 | 2/2002 |
| JP | 2007-244693 | 9/2007 |
| JP | 2018-019894 | 2/2018 |

OTHER PUBLICATIONS

Studio BentStuff Co., Ltd et al. Se-Mook, Biohazard Reverations, Issued Mar. 26, 2015 with English translation, 62 pages.

(Continued)

*Primary Examiner* — David L Lewis
*Assistant Examiner* — Robert E Mosser
(74) *Attorney, Agent, or Firm* — Nixon & Vanderhye, PC

(57) ABSTRACT

A game system includes a mode switching unit switching a play mode between a one-player play mode and a two-player play mode, on the basis of at least one of first operation data from a left controller and second operation data from a right controller, and a control unit controlling a player character and a sub-player character in a virtual space. In the one-player play mode, the control unit switches an operation target between the player character and the sub-player character is set as an operation target, on the basis of the first operation data and the second operation data, and in the two-player play mode, the control unit controls the player character on the basis of the first operation data and controls the sub-player character on the basis of the second operation data.

22 Claims, 16 Drawing Sheets

(51) Int. Cl.
*A63F 13/58* (2014.01)
*A63F 13/24* (2014.01)
*A63F 13/26* (2014.01)

(56) References Cited

U.S. PATENT DOCUMENTS

| | | | |
|---|---|---|---|
| 9,545,571 B2* | 1/2017 | Johnson | A63F 13/5375 |
| 2016/0361641 A1* | 12/2016 | Koizumi | A63F 13/24 |
| 2018/0036642 A1 | 2/2018 | Tanaka et al. | |
| 2018/0200620 A1* | 7/2018 | Yamashita | A63F 13/92 |

OTHER PUBLICATIONS

Office Action in Japan Application No. 2019-033786 dated Mar. 23, 2021, 4 pages.

* cited by examiner

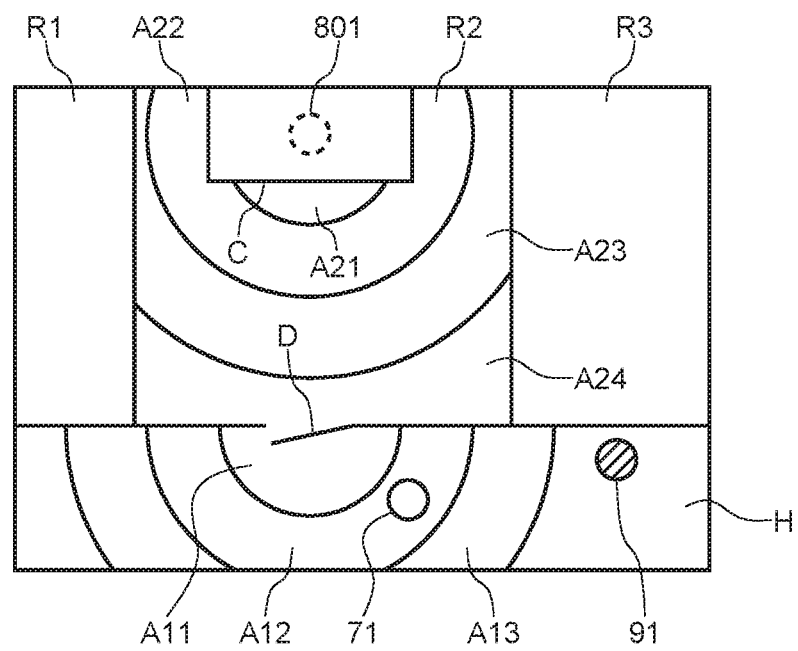
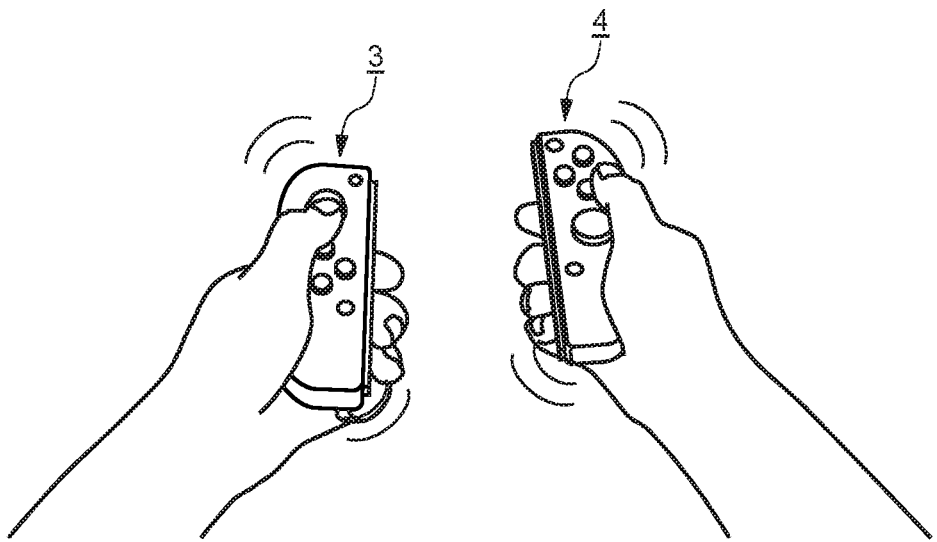
Fig.11

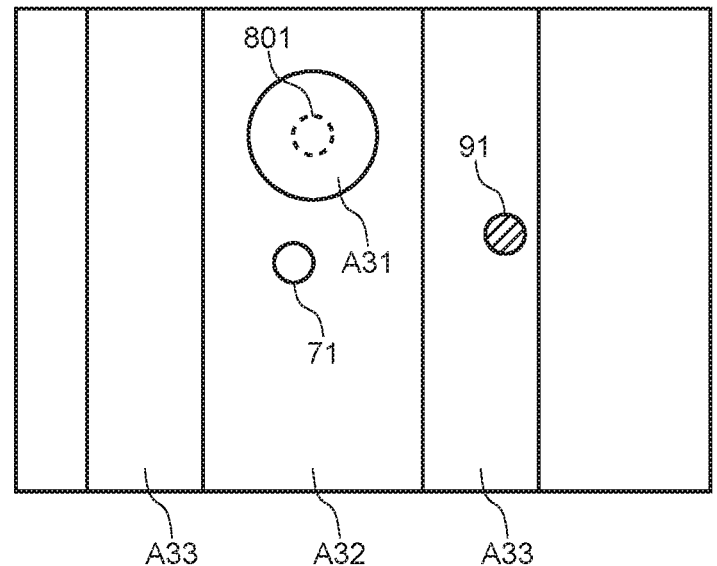
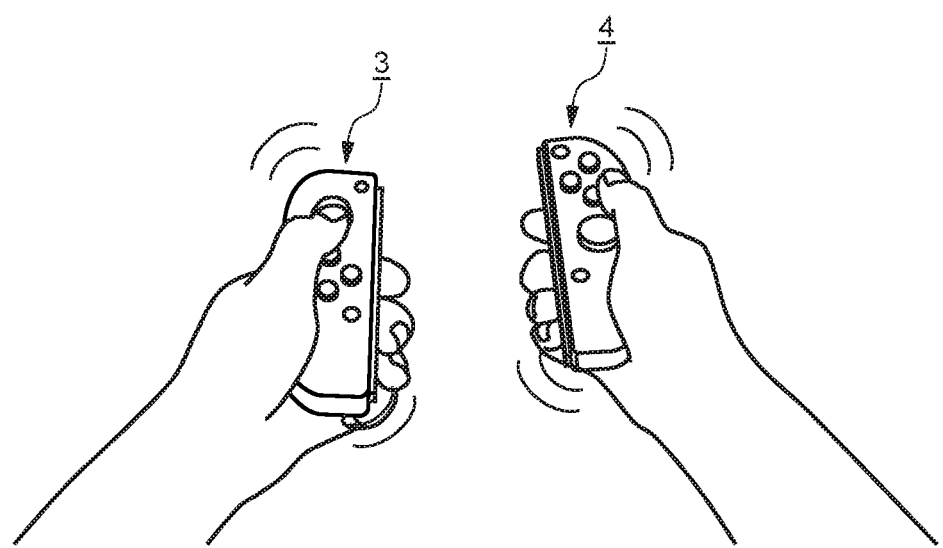
Fig.12

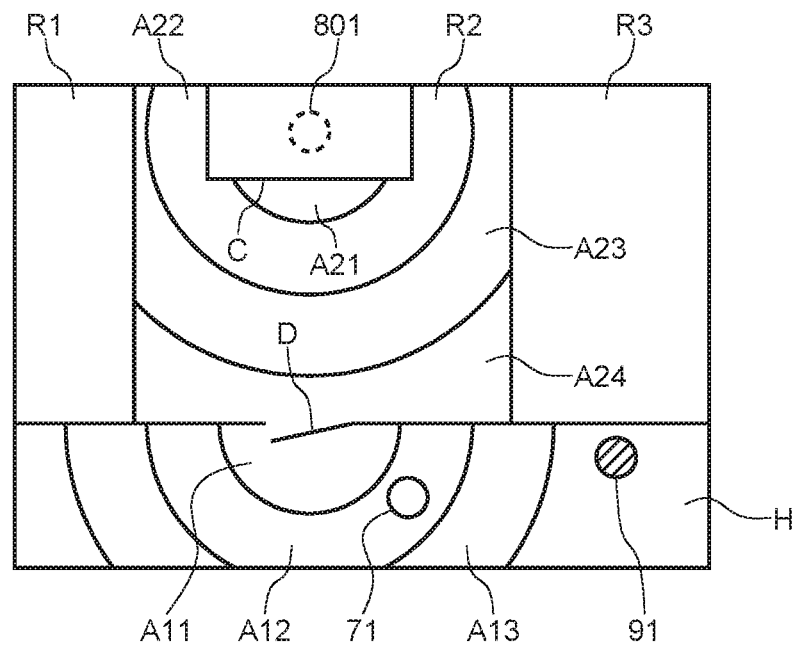
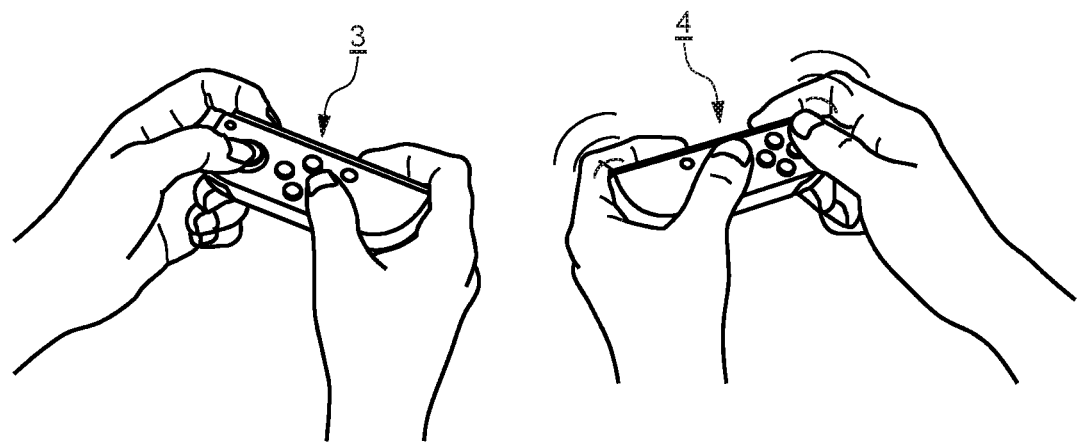
Fig.13

NON-TRANSITORY STORAGE MEDIUM HAVING STORED THEREIN GAME PROGRAM, GAME APPARATUS, GAME SYSTEM, AND GAME METHOD

CROSS REFERENCE TO RELATED APPLICATION

This nonprovisional application is based on Japanese Patent Application No. 2019-033786 filed with the Japan Patent Office on Feb. 27, 2019, the entire contents of which are hereby incorporated by reference.

FIELD

The present disclosure relates to a game program, a game apparatus, a game system, and a game method for executing a game for operating a player character in a virtual space.

BACKGROUND AND SUMMARY

Conventionally, a game is known which mainly includes a game apparatus, a plurality of controllers, and a display and in which a plurality of players operate the respective controllers to operate respective player characters in a virtual space. In particular, in a game in which a plurality of player characters aims to achieve the same purpose instead of playing against each other, the play by the plurality of players becomes a cooperative play. In the game in which the cooperative play by the plurality of players is enabled, when one player plays the game, one player operates the plurality of controllers to play the game.

JP 2018-19894 A discloses a game system for enabling selection of any one of a one-player play mode in which one player operates a plurality of controllers and a two-player play mode in which one player operates one controller and the other player operates the other controller.

The present disclosure provides a game in which a plurality of player characters can be operated in both a one-player play mode and a two-player play mode. Further, the present disclosure provides a game in which a plurality of player characters can cooperate with each other, in a two-player play mode.

A non-transitory storage medium according to an aspect is a non-transitory storage medium having stored therein a game program for causing a computer of an information processing apparatus to: acquire first operation data from a first controller and second operation data from a second controller; switch a play mode between a first mode in which one player plays a game and a second mode in which two players play the game, on the basis of at least one of the first operation data and the second operation data; for a first player character and a second player character in a virtual space, switch an operation target to be controlled between the first player character and the second player character is set as an operation target, on the basis of at least one of the first operation data and the second operation data and control the operation target on the basis of at least one of the first operation data and the second operation data, in the first mode; and control the first player character on the basis of the first operation data and control the second player character on the basis of the second operation data, in the second mode.

With this configuration, in the first mode in which one player plays a game, any one of the first player character and the second player character is set as an operation target and controlled. In the second mode in which the two players play a game, the first player character is operated by the first controller and the second player character is operated by the second controller. Therefore, a plurality of player characters can be operated in both the one-player play mode and the two-player play mode. Further, in the two-player play mode, a plurality of player characters can play a game cooperatively.

The first controller may include a first vibrator, the second controller may include a second vibrator, and the game program may further cause the computer to: generate a signal to vibrate the first vibrator and/or the second vibrator, on the basis of a position of the first player character or the second player character to be the operation target with respect to a predetermined object in the virtual space, in the first mode; and generate a signal to vibrate the first vibrator and/or the second vibrator, on the basis of a position of at least one of the first player character and the second player character with respect to the predetermined object, in the second mode.

With this configuration, a position relation between the player character and the predetermined object can be recognized by a vibration. In particular, in the second mode in which the two players play a game, if only one of the first vibrator and the second vibrator is vibrated, a player who has sensed the vibration transmits a sensing result to the other player, so that the two players can play a game while communicating with each other.

The first controller may include a first vibrator, the second controller may include a second vibrator, and the game program may further cause the computer to: determine at least one of an intensity to vibrate the first vibrator and an intensity to vibrate the second vibrator, on the basis of a position of the first player character or the second player character to be the operation target with respect to a predetermined object in the virtual space, and generate a signal to vibrate the first vibrator and/or the second vibrator with the determined intensity, in the first mode; and determine an intensity to vibrate at least one of the first vibrator and the second vibrator, on the basis of a position of at least one of the first player character and the second player character with respect to the predetermined object, and generate a signal to vibrate the first vibrator and/or the second vibrator with the determined intensity, in the second mode.

With this configuration, a position relation between the player character and the predetermined object can be recognized by the vibration intensity. In particular, in the second mode in which the two players play a game, if only one of the first vibrator and the second vibrator is vibrated, a player who has sensed the vibration transmits a sensing result including the vibration intensity to the other player, so that the two players can play a game while communicating with each other.

The game program may further cause the computer to determine an intensity to vibrate the second vibrator, on the basis of a distance between the predetermined object and the second player character, and generate a signal to vibrate the second vibrator with the determined intensity, in the second mode.

With this configuration, the intensity to vibrate the second vibrator is determined on the basis of the distance between the second player character and the predetermined object. Therefore, a player who controls the second player character by the second controller can recognize the distance between the second player character and the predetermined object by the vibration. The player transmits a recognition result to the other player, so that the two players can play a game while communicating with each other.

In the game program, the predetermined object may be an object that is not displayed.

With this configuration, a location of the object that is not displayed can be estimated by the vibration of the controller.

The game program may further cause the computer to: perform control for causing the second player character to enter a waiting state in the virtual space, control for temporarily erasing the second player character, or control for causing the erased second player character to reappear, when the first player character is controlled; and perform control for causing the first player character to enter a waiting state in the virtual space, when the second player character is controlled, in the first mode.

With this configuration, in the first mode in which one player sets any one of the first and second player characters as the operation target and plays a game, the second player character can be temporarily erased or can be caused to appear. When the second player character is not set as the operation target in the case where the second player character appears, the second player character can be caused to enter a waiting state in the virtual space.

In the game program, the first player character and the second player character may have different accessible ranges in the virtual space.

With this configuration, for a range in which one player character is inaccessible, the game can be developed by switching the operation target to the other player character to allow the other player character to enter the range and causing one player character to enter a waiting state.

The game program may further cause the computer to perform control for causing the first player character or the second player character to enter a waiting state at a position immediately before the switching of the operation target, when the first player character or the second player character is caused to enter a waiting state.

With this configuration, the player character that has been switched from the operation target to the non-operation target remains in the position when the switching is performed.

The game program may further cause the computer to perform control for causing the first player character or the second player character to enter a waiting state in a state in which a predetermined action performed immediately before the switching of the operation target is performed, when the first player character or the second player character is caused to enter a waiting state.

With this configuration, the player character that has been set as the non-operation target by the switching also continues the immediately previous action. For this reason, immediately after the switching, the player character of the operation target is also caused to perform the action. As a result, even in the first mode in which one player plays a game, cooperative play in which the first player character and the second player character perform the action cooperatively becomes possible.

A game apparatus according to another aspect includes: an operation acquisition unit to acquire first operation data from a first controller and second operation data from a second controller; a mode switching unit to switch a play mode between a first mode in which one player plays a game and a second mode in which two players play the game, on the basis of at least one of the first operation data and the second operation data; and a control unit to control a first player character and a second player character in a virtual space, wherein the control unit switches an operation target to be controlled between the first player character and the second player character is set as an operation target, on the basis of the first operation data and the second operation data and control the operation target on the basis of at least one of the first operation data and the second operation data, in the first mode, and controls the first player character on the basis of the first operation data and controls the second player character on the basis of the second operation data, in the second mode.

With this configuration, in the first mode in which one player plays a game, any one of the first player character and the second player character is set as the operation target and controlled. In the second mode in which the two players play a game, the first player character is operated by the first controller and the second player character is operated by the second controller. Therefore, a plurality of player characters can be operated in both the one-player play mode and the two-player play mode. Further, in the two-player play mode, a plurality of player characters can play a game cooperatively.

In the game apparatus, the first controller may include a first vibrator, the second controller may include a second vibrator, and the control unit may generate a signal to vibrate the first vibrator and/or the second vibrator, on the basis of a position of the first player character or the second player character to be the operation target with respect to a predetermined object in the virtual space, in the first mode, and may generate a signal to vibrate the first vibrator and/or the second vibrator, on the basis of a position of at least one of the first player character and the second player character with respect to the predetermined object, in the second mode.

With this configuration, a position relation between the player character and the predetermined object can be recognized by a vibration. In particular, in the second mode in which the two players play a game, if only one of the first vibrator and the second vibrator is vibrated, a player who has sensed the vibration transmits a sensing result to the other player, so that the two players can play a game while communicating with each other.

In the game apparatus, the first controller may include a first vibrator, the second controller may include a second vibrator, and the control unit may determine at least one of an intensity to vibrate the first vibrator and an intensity to vibrate the second vibrator, on the basis of a position of the first player character or the second player character to be the operation target with respect to a predetermined object in the virtual space, and generate a signal to vibrate the first vibrator and/or the second vibrator with the determined intensity, in the first mode, and may determine an intensity to vibrate at least one of the first vibrator and the second vibrator, on the basis of a position of at least one of the first player character and the second player character with respect to the predetermined object, and generate a signal to vibrate the first vibrator and/or the second vibrator with the determined intensity, in the second mode.

With this configuration, a position relation between the player character and the predetermined object can be recognized by the vibration intensity. In particular, in the second mode in which the two players play a game, if only one of the first vibrator and the second vibrator is vibrated, a player who has sensed the vibration transmits a sensing result including the vibration intensity to the other player, so that the two players can play a game while communicating with each other.

In the game apparatus, the control unit may cause the second player character to enter a waiting state in the virtual space, temporarily erase the second player character, or cause the erased second player character to reappear, when the first player character is controlled, and may cause the first player character to enter a waiting state in the virtual space, when the second player character is controlled, in the first mode.

With this configuration, in the first mode in which one player sets any one of the first and second player characters as the operation target and plays a game, the second player character can be temporarily erased or can be caused to appear. When the second player character is not set as the operation target in the case where the second player character appears, the second player character can be caused to enter a waiting state in the virtual space.

A game system according to another aspect includes: a first controller to generate first operation data according to an operation of a user; a second controller to generate second operation data according to an operation of the user; a mode switching unit to switch a play mode between a first mode in which one player plays a game and a second mode in which two players play the game, on the basis of at least one of the first operation data and the second operation data; and a control unit to control a first player character and a second player character in a virtual space, wherein the control unit switches an operation target to be controlled between the first player character and the second player character is set as an operation target, on the basis of the first operation data and the second operation data and control the operation target on the basis of at least one of the first operation data and the second operation data, in the first mode, and controls the first player character on the basis of the first operation data and controls the second player character on the basis of the second operation data, in the second mode.

With this configuration, in the first mode in which one player plays a game, any one of the first player character and the second player character is set as the operation target and controlled. In the second mode in which the two players play a game, the first player character is operated by the first controller and the second player character is operated by the second controller. Therefore, a plurality of player characters can be operated in both the one-player play mode and the two-player play mode. Further, in the two-player play mode, a plurality of player characters can play a game cooperatively.

In the game system, the first controller may include a first vibrator, the second controller may include a second vibrator, and the control unit may generate a signal to vibrate the first vibrator and/or the second vibrator, on the basis of a position of the first player character or the second player character to be the operation target with respect to a predetermined object in the virtual space, in the first mode, and may generate a signal to vibrate the first vibrator and/or the second vibrator, on the basis of a position of at least one of the first player character and the second player character with respect to the predetermined object, in the second mode.

In the game system, the first controller may include a first vibrator, the second controller may include a second vibrator, and the control unit may determine at least one of an intensity to vibrate the first vibrator and an intensity to vibrate the second vibrator, on the basis of a position of the first player character or the second player character to be the operation target with respect to a predetermined object in the virtual space, and generate a signal to vibrate the first vibrator and/or the second vibrator with the determined intensity, in the first mode, and may determine an intensity to vibrate at least one of the first vibrator and the second vibrator, on the basis of a position of at least one of the first player character and the second player character with respect to the predetermined object, and generate a signal to vibrate the first vibrator and/or the second vibrator with the determined intensity, in the second mode.

In the game system, the control unit may cause the second player character to enter a waiting state in the virtual space, temporarily erase the second player character, or cause the erased second player character to reappear, when the first player character is controlled, and may cause the first player character to enter a waiting state in the virtual space, when the second player character is controlled, in the first mode.

With this configuration, a position relation between the player character and the predetermined object can be recognized by a vibration. In particular, in the second mode in which the two players play a game, if only one of the first vibrator and the second vibrator is vibrated, a player who has sensed the vibration transmits a sensing result to the other player, so that the two players can play a game while communicating with each other.

A game method according to another aspect is a game method executed in a computer of an information processing apparatus. The game method includes: acquiring first operation data from a first controller; acquiring second operation data from a second controller; switching a play mode between a first mode in which one player plays a game and a second mode in which two players play the game, on the basis of at least one of the first operation data and the second operation data; for a first player character and a second player character in a virtual space, switching an operation target to be controlled between the first player character and the second player character is set as an operation target, on the basis of at least one of the first operation data and the second operation data and controlling the operation target on the basis of at least one of the first operation data and the second operation data, in the first mode; and controlling the first player character on the basis of the first operation data and controlling the second player character on the basis of the second operation data, in the second mode.

With this configuration, in the first mode in which one player plays a game, any one of the first player character and the second player character is set as the operation target and controlled. In the second mode in which the two players play a game, the first player character is operated by the first controller and the second player character is operated by the second controller. Therefore, a plurality of player characters can be operated in both the one-player play mode and the two-player play mode. Further, in the two-player play mode, a plurality of player characters can play a game cooperatively.

The first controller may include a first vibrator, the second controller may include a second vibrator, and the game method may further include: generating a signal to vibrate the first vibrator and/or the second vibrator, on the basis of a position of the first player character or the second player character to be the operation target with respect to a predetermined object in the virtual space, in the first mode; and generating a signal to vibrate the first vibrator and/or the second vibrator, on the basis of a position of at least one of the first player character and the second player character with respect to the predetermined object, in the second mode.

With this configuration, a position relation between the player character and the predetermined object can be recognized by a vibration. In particular, in the second mode in which the two players play a game, if only one of the first vibrator and the second vibrator is vibrated, a player who has sensed the vibration transmits a sensing result to the other player, so that the two players can play a game while communicating with each other.

The first controller may include a first vibrator, the second controller may include a second vibrator, and the game method may further include: determining at least one of an intensity to vibrate the first vibrator and an intensity to vibrate the second vibrator, on the basis of a position of the first player character or the second player character to be the operation target with respect to a predetermined object in the virtual space, and generating a signal to vibrate the first vibrator and/or the second vibrator with the determined intensity, in the first mode; and determining an intensity to vibrate at least one of the first vibrator and the second vibrator, on the basis of a position of at least one of the first player character and the second player character with respect to the predetermined object, and generating a signal to vibrate the first vibrator and/or the second vibrator with the determined intensity, in the second mode.

With this configuration, a position relation between the player character and the predetermined object can be recognized by the vibration intensity. In particular, in the second mode in which the two players play a game, if only one of the first vibrator and the second vibrator is vibrated, a player who has sensed the vibration transmits a sensing result including the vibration intensity to the other player, so that the two players can play a game while communicating with each other.

The game method may further include: causing the second player character to enter a waiting state in the virtual space, temporarily erasing the second player character, or causing the erased second player character to reappear, when the first player character is controlled; and causing the first player character to enter a waiting state in the virtual space, when the second player character is controlled, in the first mode.

With this configuration, in the first mode in which one player sets any one of the first and second player characters as the operation target and plays a game, the second player character can be temporarily erased or can be caused to appear. When the second player character is not set as the operation target in the case where the second player character appears, the second player character can be caused to enter a waiting state in the virtual space.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is a plan view of an example of a virtual space in a one-player play mode according to the embodiment, and a diagram illustrating the left controller and the right controller held by the player;

FIG. 12 is a diagram illustrating another example of setting of an area for determining a vibration intensity according to the embodiment;

FIG. 13 is a plan view of an example of a virtual space in a two-player play mode according to the embodiment, and a diagram illustrating the left controller and the right controller held by the player;

DETAILED DESCRIPTION OF NON-LIMITING EXAMPLE EMBODIMENTS

Hereinafter, a game system according to an embodiment will be described with reference to the drawings. The embodiment described below is an example when the present disclosure is carried out and the present disclosure is not limited to a specific configuration described below. When the present disclosure is carried out, a specific configuration according to the embodiment may be appropriately adopted.

An example of a game system 1 in the present embodiment includes a game apparatus 2, a left controller 3, and a right controller 4. The left controller 3 and the right controller 4 are individually detachable from the game apparatus 2. Specifically, it is possible to use as an integrated apparatus by attaching each of the left controller 3 and the right controller 4 to the game apparatus 2. Moreover, the game apparatus 2 and the left controller 3 and the right controller 4 can be used separately (refer to FIG. 2). In the following, a hardware configuration of the game system according to the present embodiment will be described first, and the control of the game system of the present embodiment will then be described.

Figure 1:
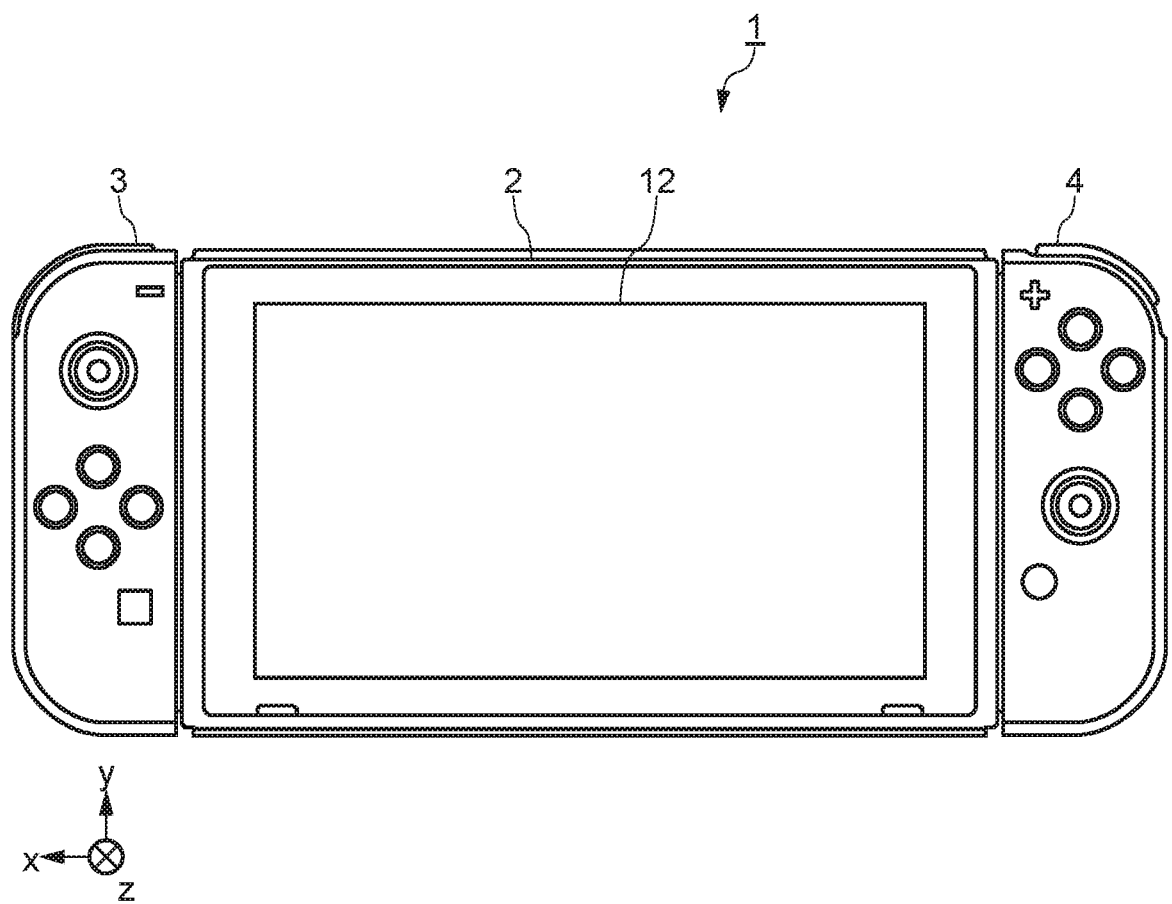
FIG. 1 is a diagram illustrating an example of a state in which a left controller and a right controller are attached to a game apparatus according to an embodiment.

FIG. 1 is a diagram illustrating a state in which the left controller 3 and the right controller 4 are attached to the game apparatus 2. As illustrated in FIG. 1, the left controller 3 and the right controller 4 are attached to and integrated with the game apparatus 2. The game apparatus 2 is an apparatus configured to execute various types of processing (for example, game processing) in the game system 1. The game apparatus 2 includes a display 12. Each of the left controller 3 and the right controller 4 is an apparatus including an operation unit used by a user to perform input.

Figure 2:
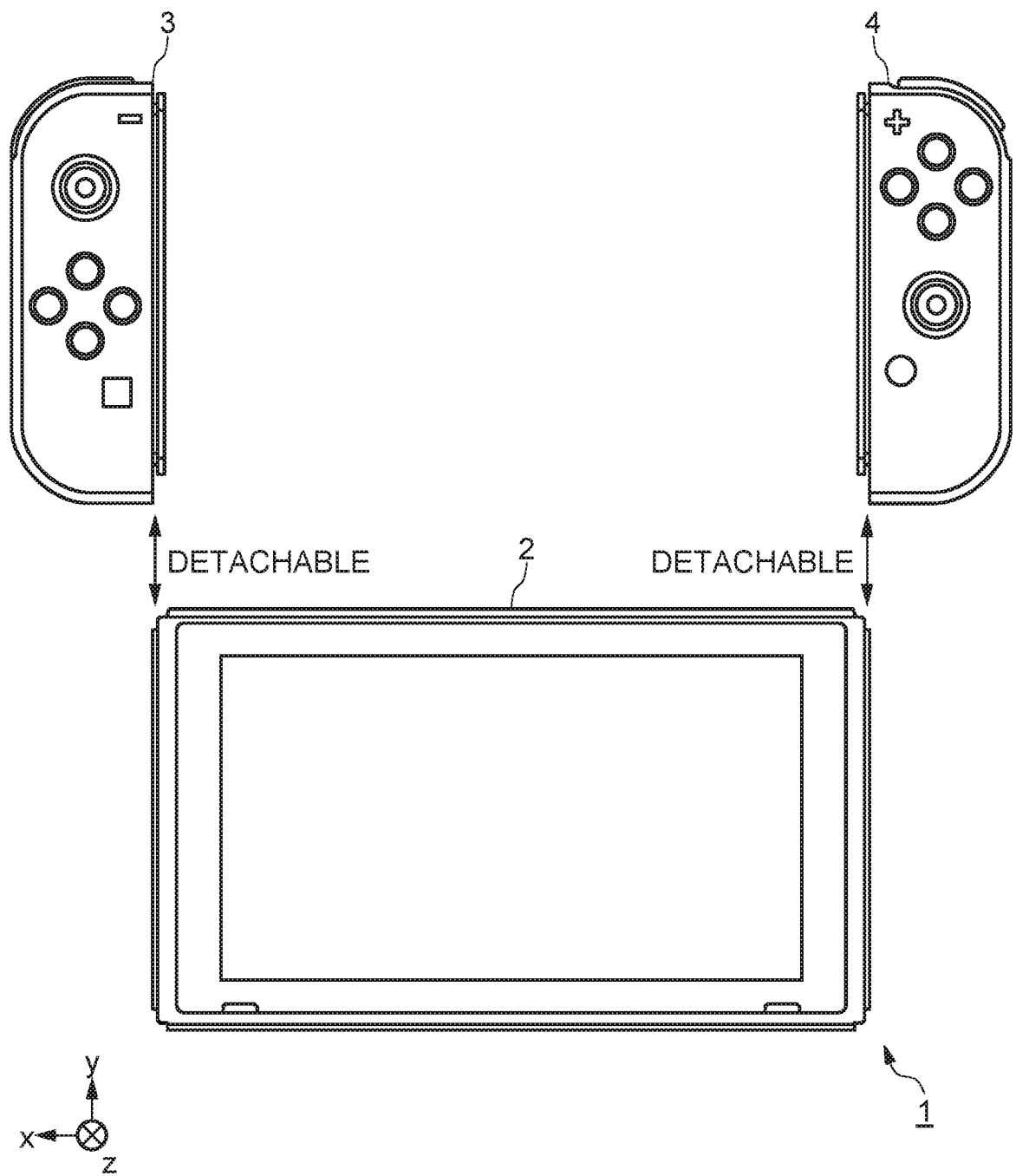
FIG. 2 is a diagram illustrating an example of a state in which the left controller and the right controller are removed from the game apparatus according to the embodiment.

FIG. 2 is a diagram illustrating an exemplary state in which the left controller 3 and the right controller 4 are removed from the game apparatus 2. As illustrated in FIGS. 1 and 2, the left controller 3 and the right controller 4 are detachable from the game apparatus 2. In the following description, the left controller 3 and the right controller 4 will be collectively referred to as the "controller" in some cases.

Figure 3:
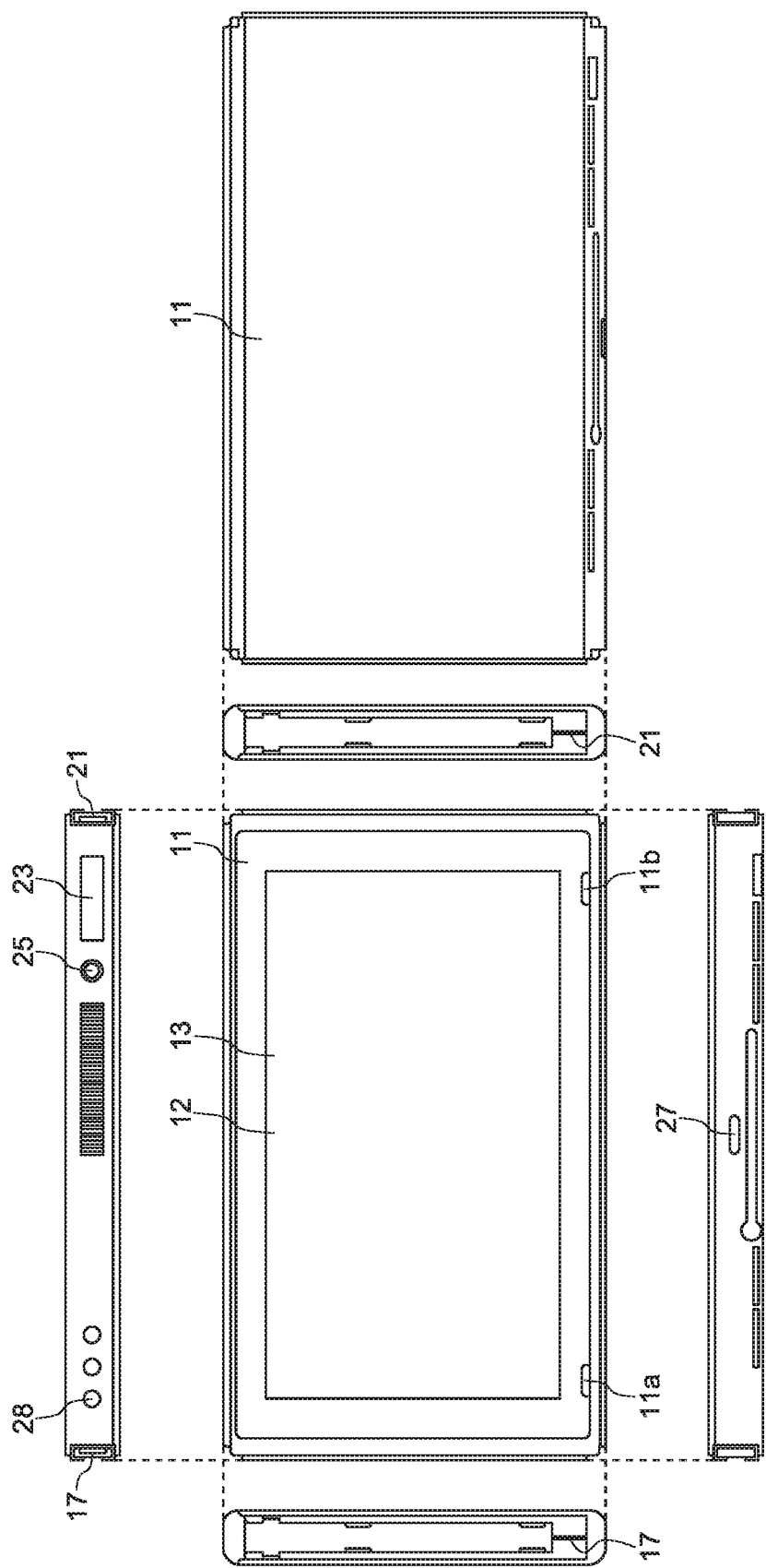
FIG. 3 is a six-sided view illustrating an example of the game apparatus according to the embodiment.

FIG. 3 is a six-sided view illustrating an example of the game apparatus 2. As illustrated in FIG. 3, the game apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the game apparatus 2 alone and the integrated apparatus in which the left controller 3 and the right controller 4 are attached to the game apparatus 2 may be a mobile apparatus. The game apparatus 2 or the integrated apparatus may be a handheld apparatus. Alternatively, the game apparatus 2 or the integrated apparatus may be a portable apparatus.

As illustrated in FIG. 3, the game apparatus 2 includes a display 12 provided on the main surface of the housing 11. The display 12 displays an image generated by the game apparatus 2. In the present embodiment, the display 12 is a liquid crystal display (LCD). Note that the display 12 may be any type of display apparatus.

The game apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The game apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the game apparatus 2 includes a left side terminal 17 as a terminal used by the game apparatus 2 to perform wired communication with the left controller 3, and a right side terminal 21 used by the game apparatus 2 to perform wired communication with the right controller 4.

As illustrated in FIG. 3, the game apparatus 2 includes a slot 23. The slot 23 is provided on the upper side surface of the housing 11. The slot 23 has a shape that enables a storage medium to be attached. The storage medium is, for example, a storage medium (for example, a dedicated memory card) dedicated to the game system 1 and the information processing apparatus of the same type as the game system 1. The storage medium is used for storing, for example, one or both of the data (for example, saved data of an application) used in the game apparatus 2 and a program (for example, an application program) executed in the game apparatus 2. Moreover, the game apparatus 2 includes a power button 28.

The game apparatus 2 includes a lower terminal 27. The lower terminal 27 is a terminal used by the game apparatus 2 to communicate with a cradle. In the present embodiment, the lower terminal 27 is a USB connector (more specifically, a female connector). When the integrated apparatus or the game apparatus 2 alone is mounted on the cradle, the game system 1 can display an image generated and output by the game apparatus 2, on the stationary monitor. Moreover, in the present embodiment, the cradle has a function of charging the above-described integrated apparatus or the game apparatus 2 alone mounted on the cradle. The cradle also has a function of a hub apparatus (specifically, a USB hub).

Figure 4:
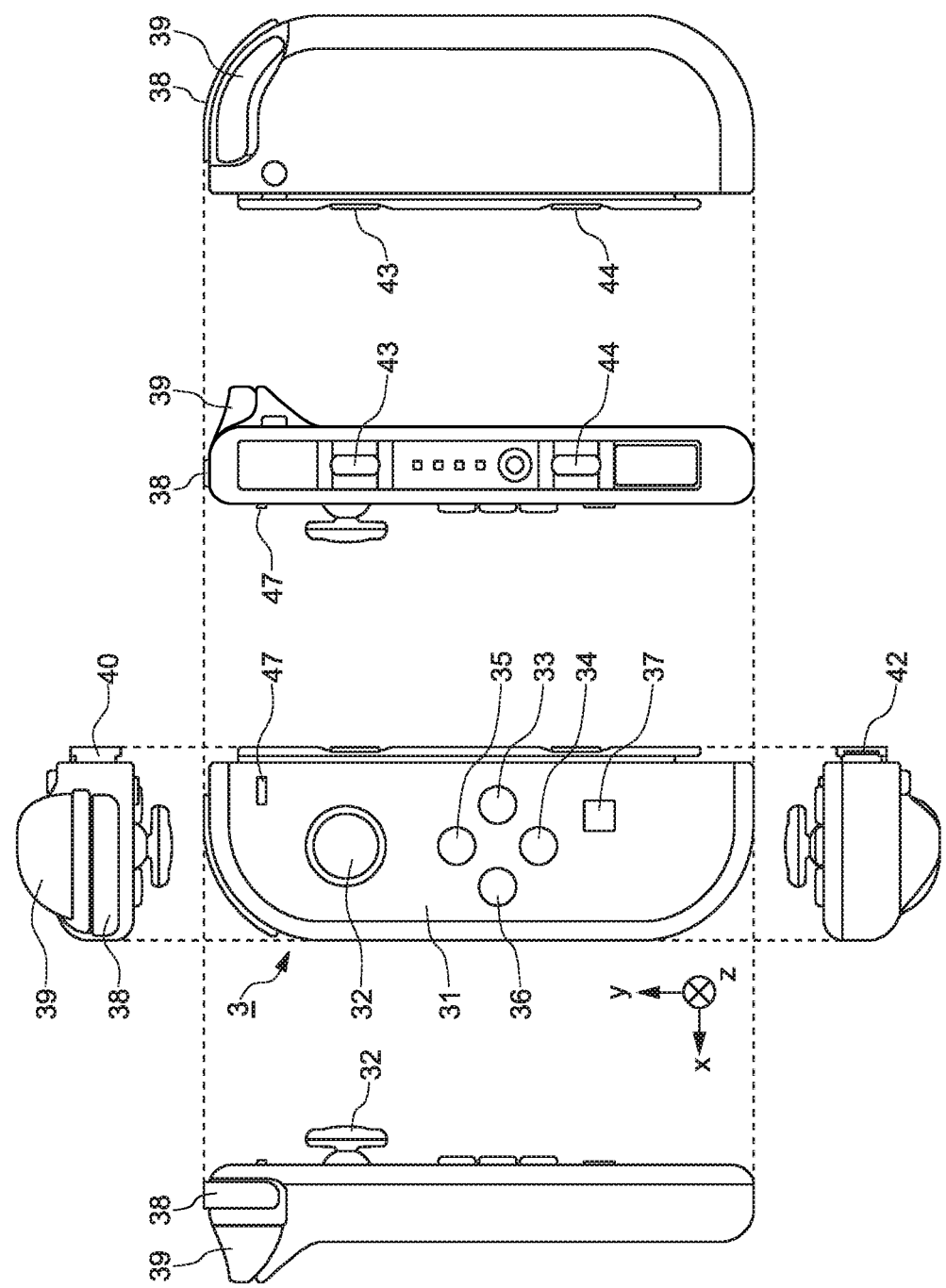
FIG. 4 is a six-sided view illustrating an example of the left controller according to the embodiment.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIG. 1). The left controller 3 can also be held in a vertically long orientation in a state detached from the game apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, a cross key or a slide stick capable of slide input may be provided as the direction input unit. Moreover, an input by pressing the analog stick is possible in the present embodiment.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Furthermore, it has a recording button 37 and a − (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the game apparatus 2. These operation buttons are used to give instructions according to various programs (for example, OS program and application program) executed by the game apparatus 2.

Moreover, the left controller 3 includes a terminal 42 used by the left controller 3 to perform wired communication with the game apparatus 2.

Figure 5:
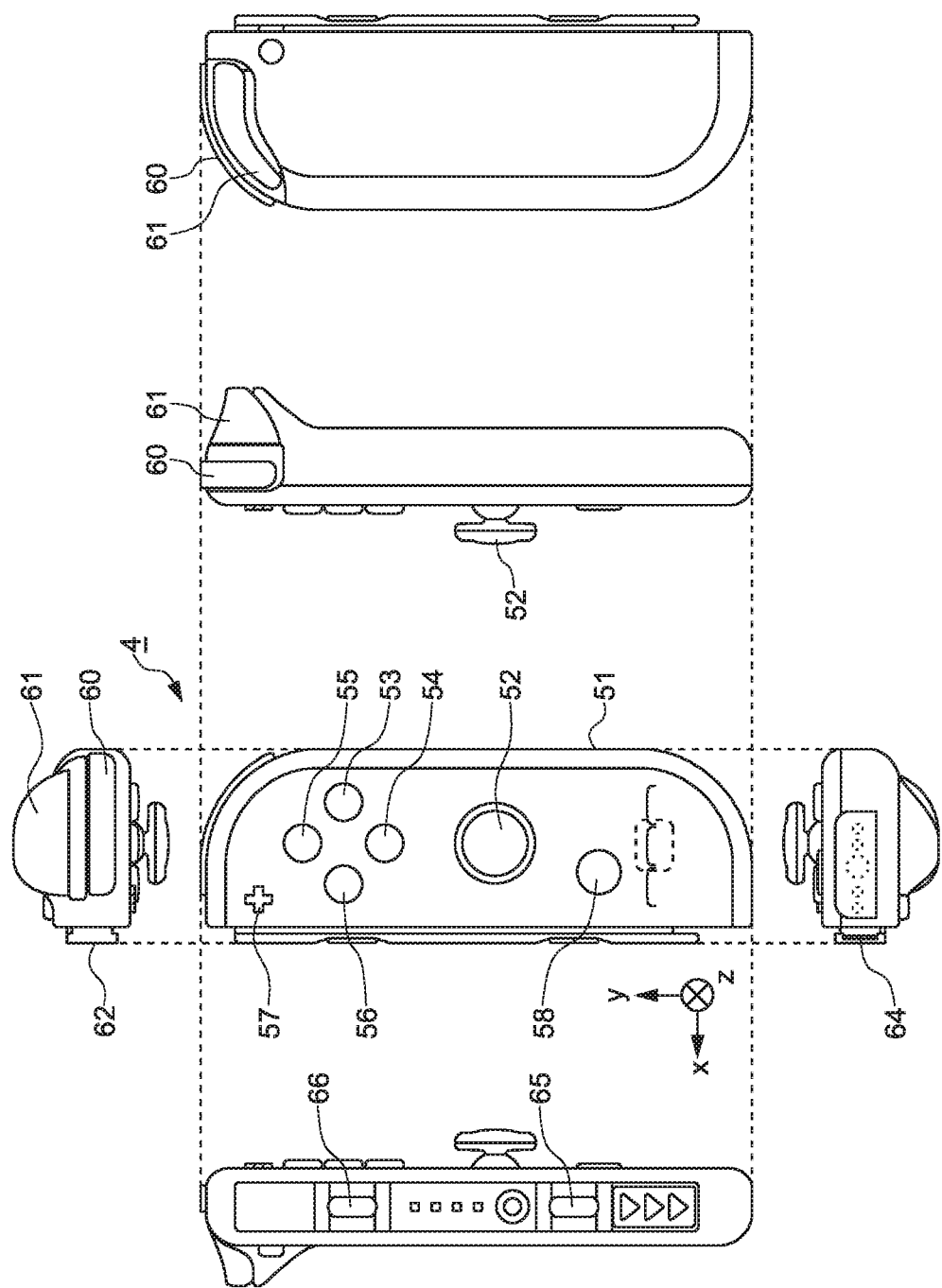
FIG. 5 is a six-sided view illustrating an example of the right controller according to the embodiment.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the game apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

Moreover, the right controller 4 includes a terminal 64 used by the right controller 4 to perform wired communication with the game apparatus 2.

Figure 6:
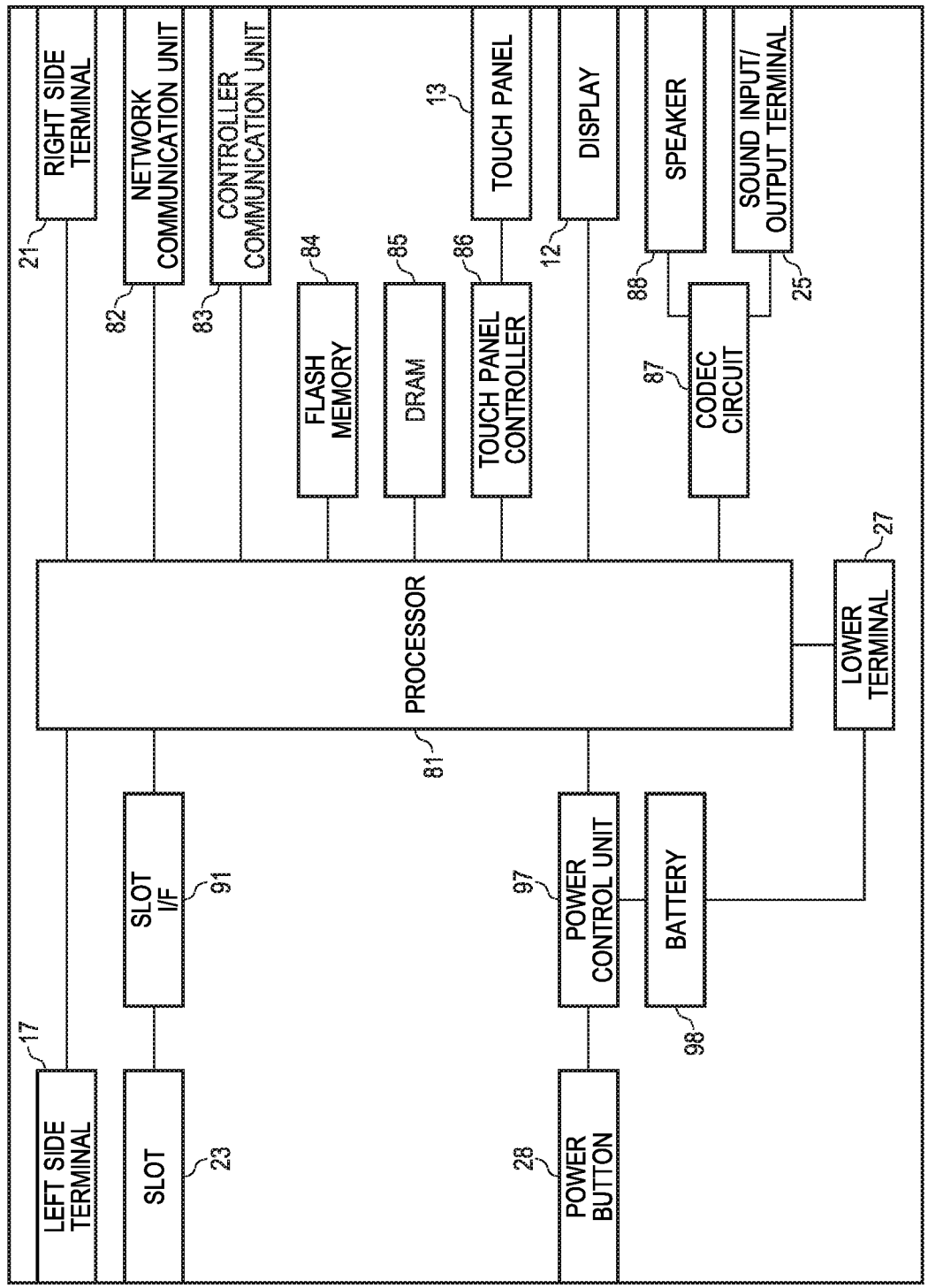
FIG. 6 is a block diagram illustrating an example of an internal configuration of the game apparatus according to the embodiment.

FIG. 6 is a block diagram illustrating an example of the internal configuration of the game apparatus 2. In addition to the configuration illustrated in FIG. 3, the game apparatus 2 includes individual components 81 to 98 illustrated in FIG. 6. Some of these components 81 to 98 may be mounted on an electronic circuit board as electronic components and stored in the housing 11.

The game apparatus 2 includes a processor 81. The processor 81 is an information processing unit that executes various types of information processing to be executed in the game apparatus 2, and more particularly, is a system-on-a-chip (SoC) including a plurality of functions such as a CPU function and a GPU function. The processor 81 executes various types of information processing by executing an information processing program (for example, a game program) stored in a storage unit (specifically, an internal storage medium such as a flash memory 84 or an external storage medium attached to the slot 23, or the like).

The game apparatus 2 includes the flash memory 84 and a dynamic random access memory (DRAM) 85 as an exemplary internal storage medium incorporated in oneself. The flash memory 84 and the DRAM 85 are connected to the processor 81. The flash memory 84 is mainly used for storing various data (or may be programs) stored in the game apparatus 2. The DRAM 85 is a memory used for temporarily storing various data used in information processing.

The game apparatus 2 includes a slot interface (hereinafter abbreviated as "I/F") 91. The slot I/F 91 is connected to the processor 81. The slot I/F 91 is connected to the slot 23, and performs reading and writing of data from/into a storage medium (for example, a dedicated memory card) attached to the slot 23 in accordance with an instruction of the processor 81.

The processor 81 appropriately reads or writes data to and from the flash memory 84 and the DRAM 85 and the individual storage media, thereby executing the above-described information processing.

The game apparatus 2 includes a network communication unit 82. The network communication unit 82 is connected to the processor 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another game apparatus 2 of the same type by a predetermined communication method (for example, communication based on a proprietary protocol or infrared communication) as a second communication mode. Note that the wireless communication according to the second communication mode is capable of performing wireless communication with another game apparatus 2 arranged in a closed local network area and achieves a function enabling "local communication" of transferring data by directly communicating among a plurality of main body apparatuses 2.

The game apparatus 2 includes a controller communication unit 83. The controller communication unit 83 is connected to the processor 81. The controller communication unit 83 performs wireless communication with one or both of the left controller 3 and the right controller 4. While it is allowable to use any communication system between the game apparatus 2 and the left controller 3 and between the game apparatus 2 and the right controller 4, the present embodiment uses communication conforming to Bluetooth standard to be used for communication by the controller communication unit 83 with the left controller 3 and with the right controller 4.

The processor 81 is connected to the left side terminal 17, the right side terminal 21, and the lower terminal 27 described above. In a case of performing wired communication with the left controller 3, the processor 81 transmits data to the left controller 3 via the left side terminal 17 and receives operation data from the left controller 3 via the left side terminal 17. Moreover, in a case of performing wired communication with the right controller 4, the processor 81 transmits data to the right controller 4 via the right side terminal 21 and receives operation data from the right controller 4 via the right side terminal 21. Moreover, in a case of communicating with the cradle, the processor 81 transmits data to the cradle via the lower terminal 27. In this manner, in the present embodiment, the game apparatus 2 can perform both wired communication and wireless communication with the left controller 3 and the right controller 4. Moreover, in a case where the integrated apparatus including the left controller 3 and the right controller 4 attached to the game apparatus 2 is attached to the cradle or where the game apparatus 2 alone is attached to the cradle, the game apparatus 2 can output data (for example, image data and sound data) to the stationary monitor, or the like, via the cradle.

Note that the game apparatus 2 can communicate simultaneously (in other words, in parallel) with a plurality of left controllers 3. Moreover, the game apparatus 2 can communicate simultaneously (in other words, in parallel) with a plurality of right controllers 4. Therefore, a plurality of users can simultaneously perform input to the game apparatus 2 using sets of left controllers 3 and right controllers 4, respectively. As an example, when a first user uses a first set of left controller 3 and right controller 4 to perform input to the game apparatus 2, a second user can simultaneously use a second set of left controller 3 and right controller 4 to perform input to the game apparatus 2.

The game apparatus 2 includes a touch panel controller 86 as a circuit for controlling the touch panel 13. The touch panel controller 86 is connected between the touch panel 13 and the processor 81. The touch panel controller 86 generates, for example, data indicating a position of input of a touch input on the basis of a signal from the touch panel 13 and outputs the generated data to the processor 81.

Moreover, the display 12 is connected to the processor 81. The processor 81 displays on the display 12 one or both of the generated image (for example, by executing the above information processing) and the image obtained from the outside.

The game apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the processor 81. The codec circuit 87 is a circuit for controlling input and output of sound data to and from the speaker 88 and the sound input/output terminal 25.

The game apparatus 2 includes a power control unit 97 and a battery 98. The power control unit 97 is connected to the battery 98 and the processor 81. Although not illustrated, the power control unit 97 is connected to each of portions of the game apparatus 2 (specifically, each of portions receiving the power supply of the battery 98, the left side terminal 17, and the right side terminal 21). The power control unit 97 controls power supply from the battery 98 to each of the above-described portions on the basis of a command from the processor 81.

Moreover, the battery 98 is connected to the lower terminal 27. In a case where an external charging apparatus (for example, a cradle) is connected to the lower terminal 27 and the power is supplied to the game apparatus 2 via the lower terminal 27, the supplied power is charged in the battery 98.

Figure 7:
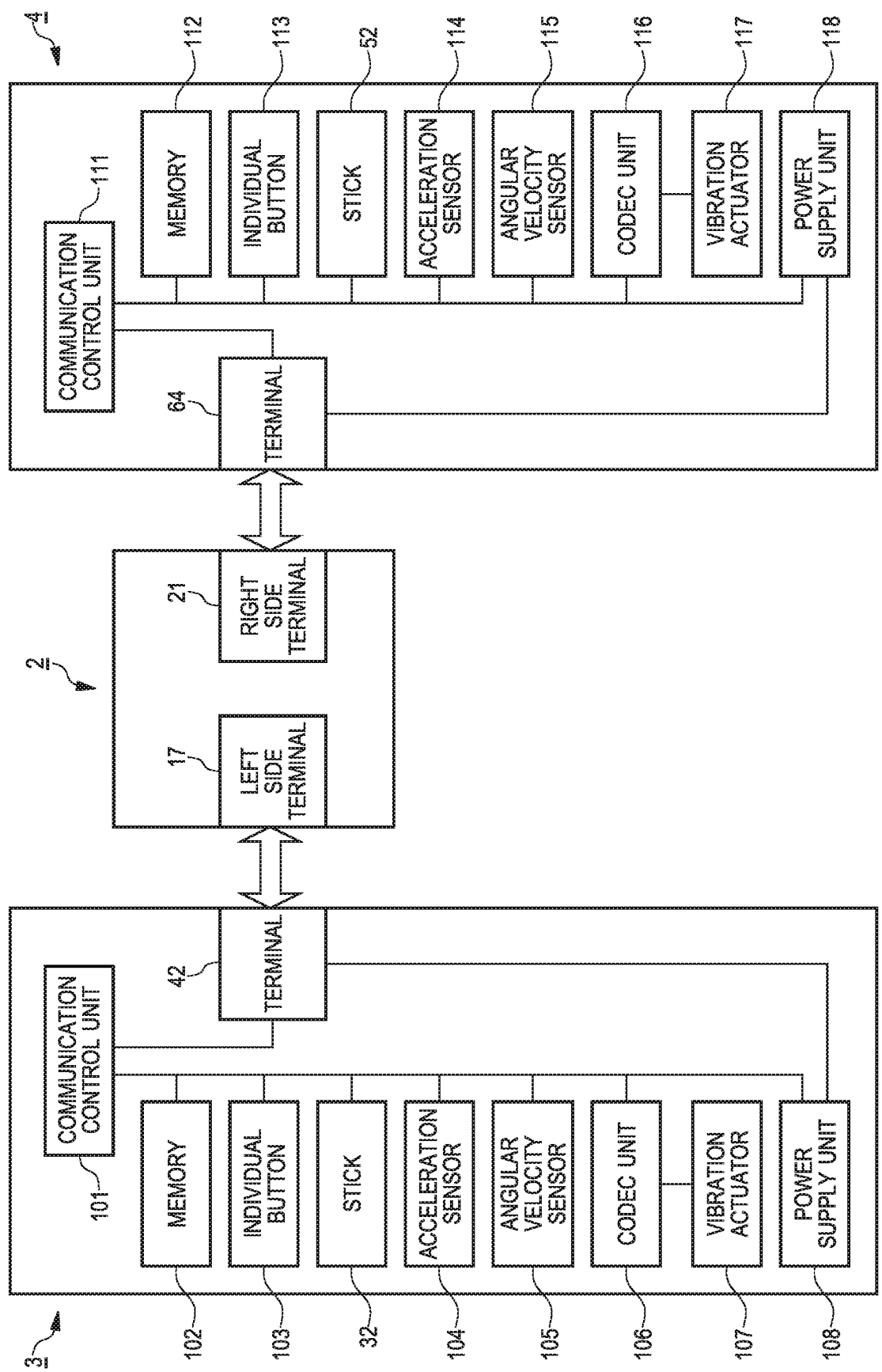
FIG. 7 is a block diagram illustrating an example of an internal configuration of the game apparatus, the left controller, and the right controller according to the embodiment.

FIG. 7 is a block diagram illustrating an exemplary internal configuration of the game apparatus 2, the left controller 3, and the right controller 4. Note that details of the internal configuration related to the game apparatus 2 are omitted in FIG. 7 because they are illustrated in FIG. 6.

The left controller 3 includes a communication control unit 101 that communicates with the game apparatus 2. As illustrated in FIG. 7, the communication control unit 101 is connected to each of components including the terminal 42. In the present embodiment, the communication control unit 101 can communicate with the game apparatus 2 by both wired communication via the terminal 42 and wireless communication not via the terminal 42. The communication control unit 101 controls a communication method performed by the left controller 3 on the game apparatus 2. That is, in a case where the left controller 3 is attached to the game apparatus 2, the communication control unit 101 communicates with the game apparatus 2 via the terminal 42. In contrast, in a case where the left controller 3 is detached from the game apparatus 2, the communication control unit 101 performs wireless communication with the game apparatus 2 (specifically, the controller communication unit 83). Wireless communication between the controller communication unit 83 and the communication control unit 101 is performed in accordance with the Bluetooth standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The left controller 3 includes an inertial sensor. Specifically, the left controller 3 includes an acceleration sensor 104. In addition, it includes an angular velocity sensor 105. In the present embodiment, the acceleration sensor 104 detects the magnitude of the acceleration in predetermined three axes (for example, the x-, y-, z-axes illustrated in FIG. 4) directions. Note that the acceleration sensor 104 may be configured to detect accelerations in one axial direction or two axial directions. In the present embodiment, the angular velocity sensor 105 detects an angular velocity around predetermined three axes (for example, the x-, y-, z-axes illustrated in FIG. 4). Note that the angular velocity sensor 105 may detect angular velocity about one axis or around two axes. Each of the acceleration sensor 104 and the angular velocity sensor 105 is connected to the communication control unit 101. Then, the detection results of the acceleration sensor 104 and the angular velocity sensor 105 are repeatedly output to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the game apparatus 2. The operation data is repeatedly transmitted at a rate of once every predetermined time. The interval at which the information related to the input is transmitted to the game apparatus 2 may either be the same or not the same for individual input units.

With transmission of the above-described operation data to the game apparatus 2, the game apparatus 2 can obtain the input performed onto the left controller 3. That is, the game apparatus 2 can distinguish the operation onto the individual buttons 103 and the analog stick 32 on the basis of the operation data. Moreover, the game apparatus 2 can calculate information related to one or both of the movement and the posture of the left controller 3 on the basis of operation data (specifically, detection results of the acceleration sensor 104 and the angular velocity sensor 105).

The left controller 3 includes a vibration actuator 107 for notifying the user by vibration. In the present embodiment, the vibration actuator 107 is controlled by a command from the game apparatus 2. That is, upon receiving the command from the game apparatus 2, the communication control unit 101 drives the vibration actuator 107 in accordance with the command. The left controller 3 includes a codec unit 106. Upon receiving the above-described command, the communication control unit 101 outputs to the codec unit 106 a control signal corresponding to the command. The codec unit 106 generates a drive signal for driving the vibration actuator 107 from the control signal from the communication control unit 101 and supplies the generated signal to the vibration actuator 107. This causes the vibration actuator 107 to operate.

The vibration command includes information of a vibration pattern including a combination of the intensity (amplitude) and the frequency of the vibration. When the intensity and the frequency are constant, the information of the vibration pattern is information of the intensity and the frequency, and when the intensity and/or the frequency change cyclically, the information of the vibration pattern is information of a pattern of temporal changes in the intensity and the frequency.

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the game apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the game apparatus 2 in both wired communication via the terminal 64 and wireless communication not via the terminal 64 (specifically, communication conforming to the Bluetooth standard) and controls the communication method performed by the right controller 4 onto the game apparatus 2.

The right controller 4 includes individual input units similar to the individual input units of the left controller 3. Specifically, the right controller 4 includes the individual buttons 113, the analog stick 52, and an inertial sensor (an acceleration sensor 114 and an angular velocity sensor 115). Each of these input units has functions similar to individual input units of the left controller 3 and operates in the similar manner.

The right controller 4 also includes a vibration actuator 117 and a codec unit 116. The vibration actuator 117 and the codec unit 116 operate similarly to the vibration actuator 107 and the codec unit 106 of the left controller 3. That is, the communication control unit 111 causes the vibration actuator 117 to operate using the codec unit 116 in accordance with a command from the game apparatus 2.

The right controller 4 includes a power supply unit 118. The power supply unit 118 has functions similar to the functions of the power supply unit 108 of the left controller 3 and operates in the similar manner.

(Configuration for Game Control)

Next, game control realized by executing a game program on the game apparatus 2 according to the present embodiment will be described. As described above, the game program is stored in an internal storage medium such as the flash memory 84 of the game apparatus 2 or an external storage medium attached to the slot 23. In the game according to the present embodiment, a character of the game moves in a three-dimensional virtual space (hereinafter, simply referred to as the "virtual space"). Hereinafter, a configuration of the game program will be described by describing a function of the game apparatus 2 realized by executing the game program according to the present embodiment.

Figure 8:
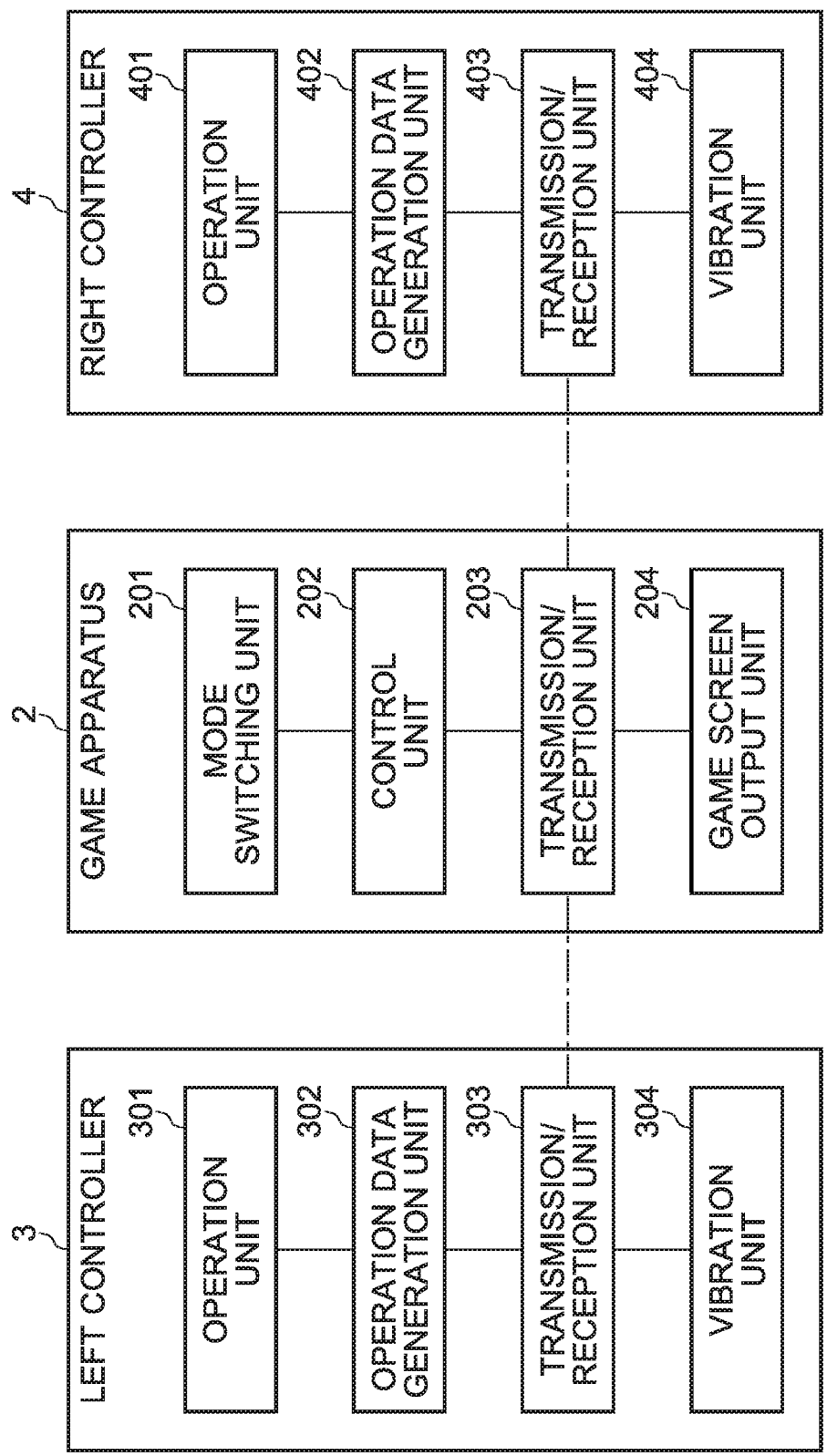
FIG. 8 is a block diagram illustrating a configuration of a game system realized by executing a game program by the game apparatus according to the embodiment.

FIG. 8 is a block diagram illustrating a configuration of a game system realized by executing the game program by the game apparatus 2. In FIG. 8, only a configuration related to the game control according to the present embodiment is illustrated. The game system 1 includes the game apparatus 2, the left controller 3, and the right controller 4.

The left controller 3 includes an operation unit 301, an operation data generation unit 302, a transmission/reception unit 303, and a vibration unit (or vibrator) 304. The right controller 4 includes an operation unit 401, an operation data generation unit 402, a transmission/reception unit 403, and a vibration unit (or vibrator) 404. The game apparatus 2 includes a transmission/reception unit 203, a mode switching unit 201, a control unit 202, and a game screen output unit 204. The mode switching unit 201 and the control unit 202 of the game apparatus 2 are realized by executing the game program according to the present embodiment by the game apparatus 2 as an information processing apparatus.

The operation unit 301 of the left controller 3 receives a user's operation. The individual buttons 103 of the left controller 3 receive a pressing operation of the user and the analog stick 32 (direction input unit) receives an inclination operation of the user, and both correspond to the operation unit 301. Further, the acceleration sensor 104 and the angular velocity sensor 105 (inertial sensor) also receive an operation in which the user moves or inclines the left controller 3, and both correspond to the operation unit 301.

The operation data generation unit 302 generates operation data indicating the content of the operation received by the operation unit 301. The operation data includes information regarding an operation type and an operation amount. The transmission/reception unit 303 transmits the operation data generated by the operation data generation unit 302 to the game apparatus 2. The communication control unit 101 and the terminal 42 for communicating with the game apparatus 2 correspond to the transmission/reception unit 303. In the present embodiment, the transmission/reception unit 303 transmits the operation data generated by the operation data generation unit 302 to the game apparatus 2 and receives a vibration command transmitted from the game apparatus 2.

The vibration unit 304 generates a vibration in accordance with the vibration command received from the game apparatus 2 by the transmission/reception unit 303. The vibration actuator 107 and the codec unit 106 generating a drive signal for driving the vibration actuator by executing codec processing on the vibration command correspond to the vibration unit 304. The vibration command includes information regarding a vibration type and a vibration intensity. The vibration actuator 107 is driven according to the vibration type and the vibration intensity in the vibration command.

A configuration of the right controller 4 is similar to that of the left controller 3. That is, the operation unit 401 receives a user's operation. All of the various buttons that receive the user's pressing operation, the direction input unit that receives the inclination operation, and the inertial sensor that receives the operation of moving or inclining the right controller 4 correspond to the operation unit 401.

Further, the operation data generation unit 402 generates operation data indicating the content of the operation received by the operation unit 401, that is, the information regarding the operation type and the operation amount. The transmission/reception unit 403 transmits the operation data generated by the operation data generation unit 402 to the game apparatus 2. The communication control unit 111 and the terminal 62 for communicating with the game apparatus 2 correspond to the transmission/reception unit 403. In the present embodiment, the transmission/reception unit 403 transmits the operation data generated by the operation data generation unit 402 to the game apparatus 2 and receives a vibration command transmitted from the game apparatus 2.

The vibration unit 404 generates a vibration in accordance with the vibration command received by the transmission/reception unit 403. The vibration actuator 117 and the codec unit 116 generating a drive signal for driving the vibration actuator by executing codec processing on the vibration command correspond to the vibration unit 404. The vibration command includes information regarding a vibration type and a vibration intensity. The vibration actuator 117 is driven according to the vibration type and the vibration intensity in the vibration command.

The transmission/reception unit 203 of the game apparatus 2 communicates with the left controller 3 and the right controller 4. Specifically, the transmission/reception unit 203 transmits a vibration command to each of the left controller 3 and the right controller 4, and receives operation data transmitted from each of the left controller 3 and the right controller 4.

The mode switching unit 201 switches a play mode between a one-player play mode in which one player plays a game and a two-player play mode in which two players play a game. The control unit 202 controls a player character as a first player character and a sub-player character as a second player character in the virtual space and executes the game.

The game screen output unit 204 generates and outputs a screen of the game to be executed by the control unit 202. The display 12 described above corresponds to the game screen output unit 204. Further, the lower terminal 27 that outputs the game screen to the stationary monitor via the cradle also corresponds to the game screen output unit 204.

(Game Control)

Figure 9:
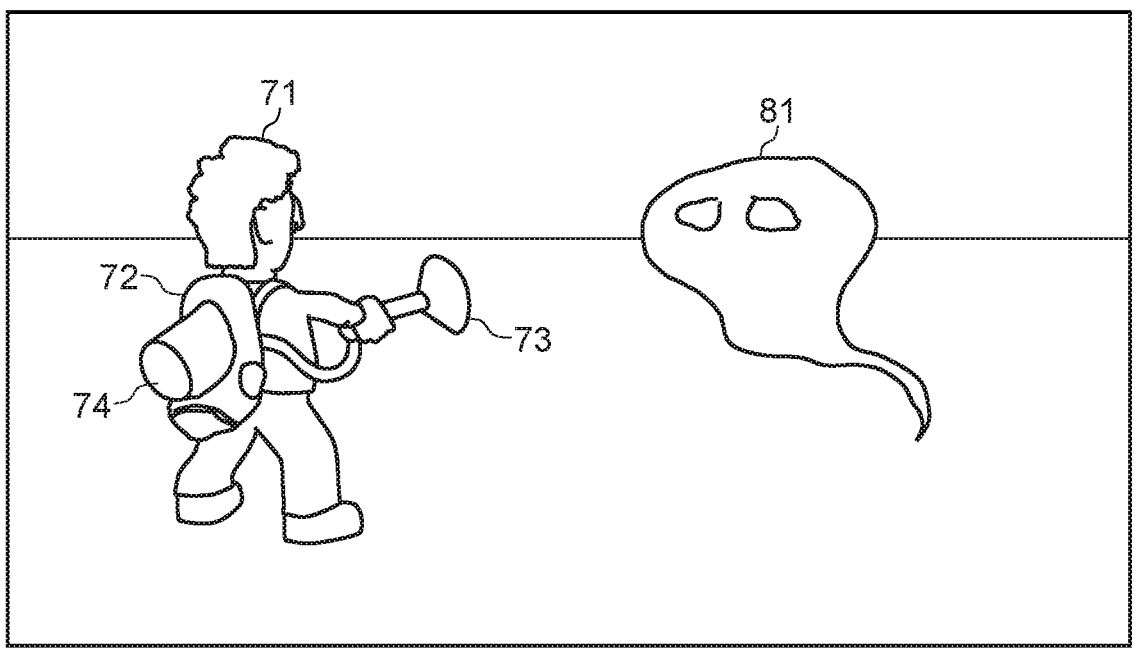
FIG. 9 is a diagram illustrating an example of a game screen according to the embodiment.

Hereinafter, the game executed by the above configuration will be described. FIG. 9 is a diagram illustrating an example of the game screen of the game according to the present embodiment. In the game according to the present embodiment, a building including a plurality of rooms and structures such as a hallway and a stair leading to the rooms is set in a virtual space, and the game is developed inside the building. A player character object (hereinafter, simply referred to as a "player character") 71 carries a vacuum cleaner object (hereinafter, simply referred to as an "a vacuum cleaner") 72 on its back, and has a nozzle object (hereinafter, simply referred to as a "nozzle") 73 at the end of a hose of the vacuum cleaner 72. The nozzle 73 can also be switched to a flashlight. A portion corresponding to a duct case of the vacuum cleaner 72 is a tank object (hereinafter, simply referred to as a "tank") 74, and a liquid is contained in the tank 74. In another embodiment, a stage of the game may be a place outside the building such as outdoors or inside a cave. The object used by the player character object is not limited to the vacuum cleaner, and the game may be played using another object.

In the game, by operating the player character 71, the player sucks an enemy character object (hereinafter, simply referred to as an "enemy character") 81 appearing in the virtual space by using the vacuum cleaner 72, goes through the building while eliminating the enemy character 81, and aims for a goal point. Further, the enemy character 81 is illuminated by the flashlight of the player character 71, so that the enemy character 81 is surprised and stops its operation temporarily. During the temporary stop of the enemy character 81, the player can change the flashlight to the nozzle 73 and can suck the enemy character 81 with the vacuum cleaner 72 to eliminate the enemy character 81.

Figure 10A:
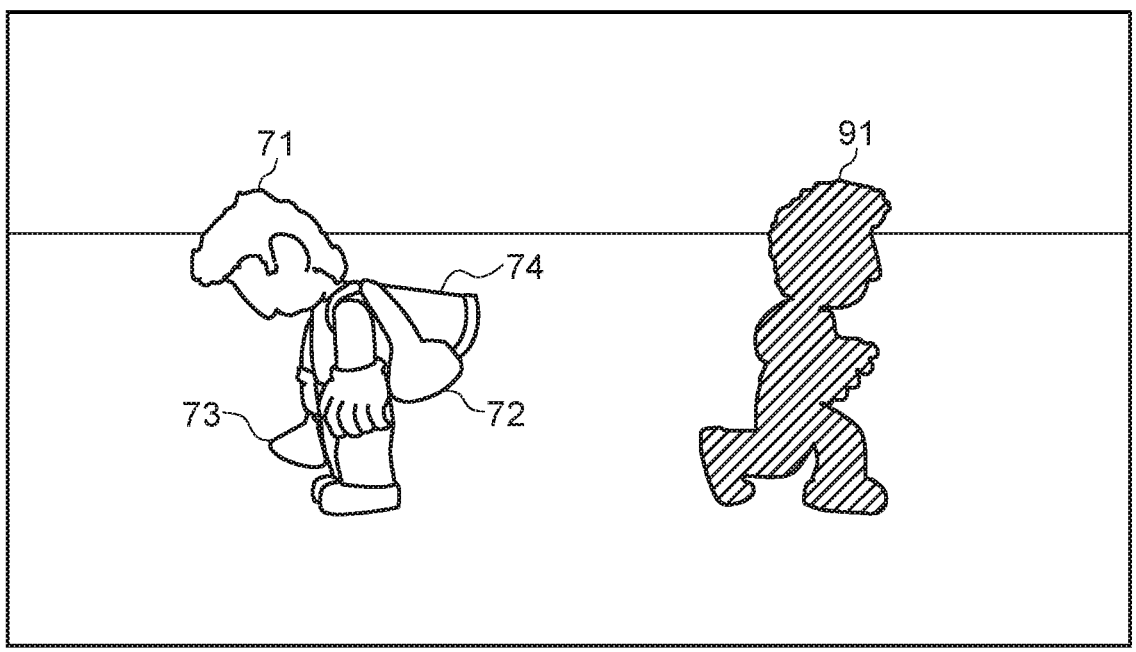
FIG. 10A is a diagram illustrating an example of a game screen of a game according to the embodiment.
Figure 10B:
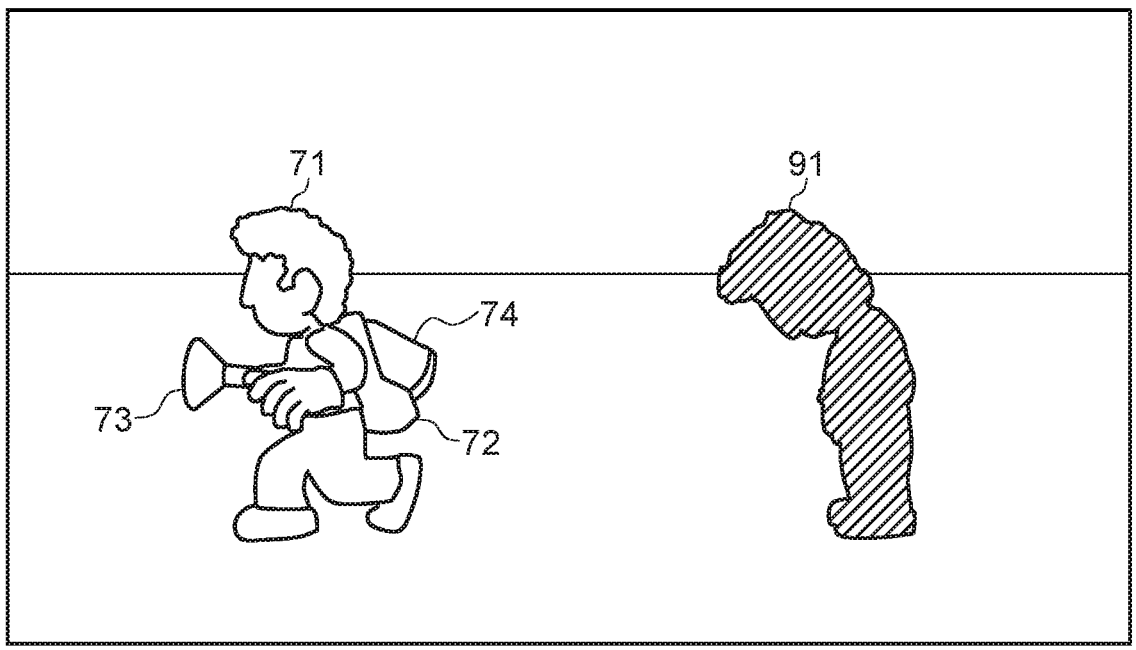
FIG. 10B is a diagram illustrating an example of a game screen of a game according to the embodiment.

FIGS. 10A and 10B are diagrams illustrating an example of the game screen of the game according to the present embodiment. As illustrated in FIGS. 10A and 10B, the player can perform a predetermined appearance operation to cause a sub-player character object (hereinafter, simply referred to as a "sub-player character") 91 to appear. When the appearance operation is performed, the liquid in the tank 74 of the vacuum cleaner 72 comes out of the vacuum cleaner 72, the liquid in the tank 74 disappears, and the sub-player character 91 appears. The sub-player character 91 has the same shape as the player character 71. However, the player character 71 wears clothes and is drawn with a plurality of colors, whereas the sub-player character 91 is drawn with a silhouette or the shade of one color. Further, the sub-player character is drawn without carrying the vacuum cleaner 72 on its back, but has a suction function of sucking the enemy character 81 and eliminating the enemy character 81.

Further, the player can erase the sub-player character 91 from the screen by performing a predetermined erasure operation at arbitrary timing. If the erasure operation is performed, the sub-player character 91 is returned to the inside of the tank 74 of the vacuum cleaner 72, the liquid is added to the inside of the tank 74, and the sub-player character 91 disappears from the virtual space.

The player character 71 and the sub-player character 91 not only have different colors, but also have different characteristics and abilities in the virtual space. Specifically, if the player character 71 is damaged and loses its life, the player character 71 resurrects to the predetermined number of times or is replaced with the reserve player character 71. If the player character 71 cannot resurrect or there is no reserve player character 71, the game ends. On the other hand, if the sub-player character 91 is damaged and loses its life, the sub-player character 91 temporarily disappears from the screen. However, before long, the liquid can be accumulated in the tank 74 of the vacuum cleaner 72 of the player character 71, and the sub-player character 91 can come out of the tank 74 again and appear in the virtual space. There is no limit on the number of such resurrections, and the sub-player character 91 can appear any number of times as long as the player character 71 is alive.

Further, even if the player character 71 is located in a place where there is a water object in the virtual space, the player character 71 has no influence. However, if the sub-player character 91 touches the water object, the sub-player character 91 melts and disappears. Further, there are places where spike objects are provided on a floor or a wall in the virtual space. If the player character 71 touches the spike objects, the player character 71 is damaged. For this reason, when spikes are laid on the floor, the player character 71 cannot pass the spike objects. On the other hand, the sub-player character 91 is not affected by the spike objects.

Further, the player character 71 is damaged by hitting an arrow object and cannot pass an arrow. However, the sub-player character 91 is not affected even if the arrow object hits the sub-player character 91, and the arrow object passes through the sub-player character 91 without damaging the sub-player character 91.

Further, if the player character 71 is located in a place set as a damage area, the player character 71 is damaged. However, the sub-player character 91 is not affected by the damage area. Further, the player character 71 can pass through a door by opening and closing a door object, but the sub-player character 91 cannot open the door object and cannot pass through the door.

Further, the player character 71 cannot pass through a fence object, but the sub-player character 91 can pass through the fence object. Further, the player character 71 cannot pass through a drain object and a pipe object, but the sub-player character 91 can pass through the drain object and the pipe object.

Further, even if the player character 71 cannot pass through a gap, the sub-player character 91 can pass through the gap. As an example, the sub-player character 91 can pass through a gap up to a gap of a half width of a minimum gap through which the player character 71 can pass.

As described above, the sub-player character 91 is set to be made of a gummy or jelly-like material, and according to the setting, a difference in the characteristics and abilities between the player character 71 and the sub-player character 91 is designed. As a result, the player character 71 and the sub-player character 91 have different accessible ranges in the virtual space.

Hereinafter, the game control will be further described together with the operation of the game system 1.

<Play Mode>

As described above, the game according to the present embodiment has the one-player play mode in which one player plays the game and the two-player play mode in which two players play the game. The mode switching unit 201 switches between the one-player play mode and the two-player play mode, on the basis of operation data for mode switching from either the left controller 3 or the right controller 4. The mode switching may be performed from both the left controller 3 and the right controller 4, or the mode switching may be performed from only one controller.

When a game is played in the one-player play mode, by performing the appearance operation, the sub-player character 91 can come out of the tank 74 of the vacuum cleaner 72 at arbitrary timing and can appear in the virtual space, and by performing the erasure operation, the sub-player character 91 can be accommodated in the tank 74 of the vacuum cleaner 72 at arbitrary timing and can be temporarily erased from the virtual space. Further, when a game is played in the two-player play mode, one player operates the player character 71 and the other player operates the sub-player character 91.

<One-Player Play Mode>

In the one-player play mode, if the control unit 202 receives the appearance operation from the left controller 3 or the right controller 4 in a state where the sub-player character 91 does not appear in the virtual space, the control unit 202 eliminates the liquid in the tank 74 of the vacuum cleaner 72 of the player character 71 and causes the sub-player character 91 to appear in the virtual space. Further, if the control unit 202 receives the erasure operation from the left controller 3 or the right controller 4 in a state where the sub-player character 91 appears in the virtual space, the control unit 202 temporarily erases the sub-player character 91 from the virtual space and adds the liquid to the tank 74 of the vacuum cleaner 72 of the player character 71 that has been emptied. That is, by causing the appearance, the erasure, the re-appearance, and the re-erasure of the sub-player character 91 in accordance with the appearance operation and the erasure operation, the control unit 202 can switch between the appearance and the erasure.

In the one-player play mode, one player operates the left controller 3 and the right controller 4. When the player character 71 and the sub-player character 91 are located in the virtual space, the control unit 202 sets as an operation target any one of the player character 71 and the sub-player character 91 in accordance with the switching operation from the left controller 3 or the right controller 4. The details of switching processing of the operation target will be described later.

One of the player character 71 and the sub-player character 91 set as the operation target (hereinafter, referred to as an "operation target character") is operated in the virtual space, on the basis of the operation data from the left controller 3 (hereinafter, also referred to as "first operation data") and the operation data from the right controller 4 (hereinafter, also referred to as "second operation data"). On the other hand, the other of the player character 71 and the sub-player character 91 not set as the operation target (hereinafter, referred to as a "non-operation target character") stands still with a head lowered and enters a waiting state. At this time, the non-operation target character may enter a waiting state while maintaining a state in which an action such as suction performed immediately before is performed.

FIG. 10A illustrates an aspect in which the sub-player character 91 is the operation target character, and the player character 71 is the non-operation target character, lowers a head, and enters a waiting state on the spot. In contrast, FIG. 10B illustrates an aspect in which the player character 71 is the operation target character, and the sub-player character 91 is the non-operation target character, lowers a head, and enters a waiting state on the spot.

Although the non-operation target character enters a waiting state on the spot, the non-operation target character is moved to prevent occurrence of a situation where the operation target character moves in the virtual space in accordance with the operation of the player, the distance between the operation target character and the non-operation target character is too large, and the non-operation target character goes out of the screen. For example, when the non-operation target character is likely to go out of the screen, the non-operation target character is moved in the virtual space in accordance with the movement direction of the operation target character so as to maintain a screen edge. Alternatively, when the operation target character tries to move away from the non-operation target character by a predetermined distance or more, the non-operation target character may follow the operation target character and may move in the virtual space. When the non-operation target character cannot be moved due to an obstacle or the like, the non-operation target character may be temporarily erased and may be caused to reappear near the operation target character.

As described above, in the one-player play mode, when the player character 71 is set as the operation target character, on the basis of at least one of the first operation data and the second operation data, the control unit 202 causes the sub-player character 91 to enter a waiting state in the virtual space, causes the sub-player character 91 to follow the player character 71, temporarily erases the sub-player character 91, or causes the erased sub-player character 91 to reappear. Further, when the sub-player character 91 is set as the operation target character in the one-player play mode, the control unit 202 causes the player character 71 to enter a waiting state in the virtual space.

<Two-Player Play Mode>

In the two-player play mode, the control unit 202 controls the player character 71 on the basis of the first operation data from the left controller 3, and controls the sub-player character 91 on the basis of the second operation data from the right controller 4. Even in the two-player play mode, any one of the player character 71 and the sub-player character 91 is forcibly moved by causing one to follow the movement of the other so that both the player character 71 and the sub-player character 91 are displayed on the screen. Instead of the above, the control unit 202 may control the player character 71 on the basis of the second operation data from the right controller 4, and may control the sub-player character 91 on the basis of the first operation data from the left controller 3. Alternatively, it may be possible to switch and set them.

<Reaction to Predetermined Enemy Character>

In the game according to the present embodiment, a plurality of enemy characters 81 appear. However, a specific enemy character 81 (hereinafter, referred to as a "specific enemy character 801") of the plurality of enemy characters 81 is a character that is not displayed on the game screen unless a predetermined condition is satisfied in the game screen. If the player character 71 or the sub-player character 91 approaches the specific enemy character 801, the control unit 202 generates a vibration command and transmits the vibration command from the transmission/reception unit 203 to the left controller 3 or the right controller 4. At this time, the liquid in the tank 74 of the vacuum cleaner 72 of the player character 71 bubbles or the sub-player character 91 shakes at the same time. That is, there is an effect that shaking of the player character 71 or the sub-player character 91 becomes shaking of the controller 3 or the controller 4 and is transmitted to the player. By the vibration of the left controller 3 or the right controller 4, the player can estimate a location of the hidden specific enemy character 801. Specifically, the following is performed.

<One-Player Play Mode>

In the one-player play mode, the control unit 202 determines the vibration intensity in the vibration command on the basis of the position of the operation target character with respect to the specific enemy character 801, and generates a vibration command to vibrate the left controller 3 and the right controller 4 with the determined intensity. Instead of this, only one of the left controller 3 and the right controller 4 may be vibrated.

FIG. 11 is a plan view of an example of the virtual space in the one-player play mode, and a diagram illustrating the left controller 3 and the right controller 4 held by the player. In the example of FIG. 11, a virtual space including a plurality of rooms R1 to R3 and a hallway H is illustrated. A door D is provided between the hallway H and the room R2, and the player character 71 can enter and leave the room R2 through the door D. Further, FIG. 11 illustrates an example in which the player character 71 is an operation target character. In the present embodiment, the specific enemy character 801 is hidden in a closet C of the room R2.

The control unit 202 performs control such as generating a vibration when the player character 71 or the sub-player character 91 approaches the specific enemy character 801, and increasing the vibration intensity when the player character 71 or the sub-player character 91 further approaches the specific enemy character 801, so that the player can estimate the location of the specific enemy character 801 by the vibration of the left controller 3 or the right controller 4. For this reason, areas for determining the vibration intensity are set in the virtual space.

As illustrated in FIG. 11, in the hallway H that is relatively far from the specific enemy character 801, the areas for determining the vibration are set on the basis of the door D to be a doorway of the room R2 where the specific enemy character 801 is located. Specifically, a circular area A11 is set around the door D, a concentric donut-shaped area A12 is set on the outside of the area A11, and a concentric donut-shaped area A13 is set on the outside of the area A12.

Further, in the room R2, a circular area A21 is set around the closet C or the specific enemy character 801, a concentric donut-shaped area A22 is set on the outside of the area A21, a concentric donut-shaped area A23 is set on the outside of the area A22, and the outside of the area A23 in the room R2 becomes an area A24.

The control unit 202 determines the vibration intensity according to the areas A11 to A13 when the player character 71 or the sub-player character 91 to be the operation target character is located in the hallway H. Specifically, the control unit 202 increases the vibration intensity (in the present example, the intensity is 60%) when the operation target character is located in the area A11, that is, when the operation target character is very close to the door D. When the operation target character is located in the area A12, the operation target character is closer to the door D than when the operation target character is located in the area A13. Therefore, the control unit 202 relatively increases the vibration intensity (in the present example, the intensity is 40%).

When the player character 71 or the sub-player character 91 to be the operation target character is located in the area A13, the operation target character is farther from the door D than when the operation target character is located in the area A12. Therefore, the control unit 202 relatively decreases the vibration intensity (in the present example, the intensity is 20%). Furthermore, when the operation target character is located outside the area A13, the operation target character is sufficiently away from the door D. Therefore, the control unit 202 does not generate the vibration command (that is, the control unit 202 determines the vibration intensity as 0).

As described above, when the door D of the room R2 where the specific enemy character 801 is located is closer to the operation target character, the vibration intensity is increased. As a result, the player can recognize approaching or moving away from the room R2 where the specific enemy character 801 is located, by using a change in the vibration intensity. That is, when the operation target character is located in the hallway H, the player performs movement while estimating a room where the specific enemy character 801 is located, by using the vibration intensity.

If the player character 71 to be the operation target character enters the room R2 through the door D, the control unit 202 first maintains the vibration intensity in the area A11 in the area A24 (in the present example, the intensity is 60%). In the room R2 where the specific enemy character 801 is located, if the player character 71 or the sub-player character 91 to be the operation target character approaches the specific enemy character 801 or the closet C where the specific enemy character 801 is hidden, the control unit 202 increases the vibration intensity.

Specifically, when the player character 71 or the sub-player character 91 to be the operation target character is located in the area A23, the control unit 202 increases the vibration intensity more than when the operation target character is located in the area A24 (in the present example, the intensity is 80%). Furthermore, when the operation target character enters the area A22, the control unit 202 further increases the vibration intensity (in the present example, 100%). Furthermore, when the operation target character enters the area A21 to be very close to the specific enemy character 801, the control unit 202 causes the specific enemy character 801 to come out of the closet C and appear on the game screen.

As such, when the specific enemy character 801 is hidden in the room R2 and the player character 71 or the sub-player character 91 to be the operation target character are located outside the room R2, the player first needs to specify the room where the specific enemy character 801 is hidden. For this reason, the vibration intensity is determined on the basis of the distance between the operation target character and the door D of the room R2. In the case in which the operation target character is located in the room R2 where the specific enemy character 801 is located, when the vibration intensity is determined according to the distance between the specific enemy character 801 and the operation target character, the vibration may be set stronger when the operation target character faces the specific enemy character 801. In this case, the player can easily find the specific enemy character 801 by changing the orientation of the operation target character on the spot.

FIG. 12 is a diagram illustrating another example of setting of areas for determining the vibration intensity. In the present example, a circular area A31 is set around the position of the specific enemy character 801, an area A32 extending in a vertical direction with a predetermined width around the enemy character is set, and areas A33 extending in the vertical direction with a predetermined width are set on both sides of the area A32.

When the player character 71 or the sub-player character 91 to be the operation target character is located in the area A31, that is, the operation target character is very close to the specific enemy character 801, the control unit 202 maximizes the vibration intensity. When the player character 71 to be the operation target character is located in the area A32, the operation target character is closer to the specific enemy character 801 than when the operation target character is located in the area A33, so that the control unit 202 relatively increases the vibration intensity.

When the player character 71 or the sub-player character 91 to be the operation target character is located in the area A33, the operation target character is farther from the specific enemy character 801 than when the operation target character is located in the area A32, so that the control unit 202 relatively decreases the vibration intensity. Furthermore, when the operation target character is located outside the area A33, the operation target character is sufficiently away from the specific enemy character 801. Therefore, the control unit 202 does not generate the vibration command (that is, the control unit 202 determines the vibration intensity as 0).

As described above, when the specific enemy character 801 is closer to the operation target character, the vibration intensity is increased. As a result, the player can recognize approaching or moving away from the specific enemy character 801, by using the vibration intensity. That is, since the specific enemy character 801 is not displayed on the screen, the player performs the movement while estimating a position where the specific enemy character 801 is located, by using the vibration intensity. The specific enemy character 801 is displayed on the screen when a predetermined condition is satisfied (for example, the operation target character goes very close to the position of the specific enemy character 801).

In the present embodiment and its modifications, the control unit 202 sets a plurality of areas on the basis of the specific enemy character 801 as described above, and determines the vibration intensity on the basis of the distance and the direction of the operation target character with respect to the specific enemy character 801. However, instead of this, the control unit 202 may determine the vibration intensity on the basis of only the distance between the specific enemy character 801 and the operation target character. Alternatively, the control unit 202 may determine the vibration intensity on the basis of only the direction of the operation target character with respect to the specific enemy character 801. In this case, the plurality of areas for determining the intensity are defined radially around the operation target character. The areas for determining the vibration intensity may be set in two steps, or may be set in arbitrary three or more steps. Further, the areas based on the specific enemy character 801 or the operation target character for determining the vibration intensity may be set in other shapes.

Further, in the present embodiment, the vibration intensity is determined on the basis of the position of the operation target character. However, instead of this, the vibration intensity may be determined on the basis of the position of one of the player character 71 and the sub-player character 91 close to the specific enemy character 801. In this case, when the sub-player character 91 appears, the vibration intensity may be determined on the basis of the position of the sub-player character 91 regardless of whether or not it is the operation target character, and when the sub-player character 91 does not appear, the vibration intensity may be determined on the basis of the position of the player character 71. Alternatively, when the sub-player character 91 appears, the vibration may be performed only when the sub-player character 91 is operated, and the vibration may not be performed when the player character 71 is operated.

Thereby, an effect that the sub-player character 91 responds to the specific enemy character 801 and shakes can be realized. That is, when the sub-player character 91 comes out of the vacuum cleaner which the player character 71 carries on its back and is located in the virtual space, the vibration intensity is determined on the basis of the position of the sub-player character 91, and when the sub-player character 91 becomes a liquid and is accommodated in the tank 74 of the vacuum cleaner 72 of the player character 71, the sub-player character 91 that becomes the liquid in the tank 74 responds to the specific enemy character 801 and shakes. However, an effect that shaking is transmitted to the player character 71 and the player character 71 shakes can be realized. In another embodiment, only when the sub-player character 91 is operated, the vibration may be performed, and when the sub-player character 91 becomes a liquid and is accommodated in the tank 74 of the vacuum cleaner 72 of the player character 71, only an effect of bubbles in the tank 74 may be performed.

Further, the control unit 202 may vary the vibration intensity between the left controller 3 and the right controller 4, on the basis of the position of the operation target character with respect to the specific enemy character 801. For example, when the specific enemy character 801 is located in the left direction as viewed from the operation target character, the vibration intensity of the left controller 3 may be caused to be stronger than the vibration intensity of the right controller 4. In this case, the right controller 4 may not be vibrated. Further, when the specific enemy character 801 is located in the right direction as viewed from the operation target character, the vibration intensity of the right controller 4 may be caused to be stronger than the vibration intensity of the left controller 3. In this case, the left controller 3 may not be vibrated. Furthermore, even in the case where the vibration intensity is varied between the left controller 3 and the right controller 4, when the operation target character is located at a substantially center position with respect to the specific enemy character 801, the vibration intensity may be determined so that the vibration is the same between the left controller 3 and the right controller 4.

As such, by causing the vibration intensity of the left controller 3 to be different from the vibration intensity of the right controller 4 according to the direction of the specific enemy character 801, the player can recognize a direction where the specific enemy character 801 is located as viewed from the operation target character, by using the vibration.

Further, the control unit 202 may generate a vibration command for causing the vibration intermittently. In this case, the control unit 202 may change an intermittent vibration interval, on the basis of the position of the operation target character with respect to the specific enemy character 801. Specifically, when the operation target character is closer to the specific enemy character 801, the interval may be shortened, and a continuous vibration may be applied in the area (in the above example, the first area A1) closest to the specific enemy character 801.

<Two-Player Play Mode>

In the case of the two-player play mode, the control unit 202 generates a vibration command to vibrate the right controller 4 to operate the sub-player character 91, on the basis of the position of the sub-player character 91 with respect to the specific enemy character 801. Thereby, a player who operates the sub-player character 91 can recognize that the specific enemy character 801 is located near the sub-player character 91, by using the vibration, and can transmit the recognition to a player who operates the player character 71. In this way, the two players can progress the game while communicating with each other.

FIG. 13 is a plan view of an example of the virtual space in the two-player play mode, and a diagram illustrating the left controller 3 and the right controller 4 held by the player. In the two-player play mode, the control unit 202 determines the vibration intensity on the basis of the position of the sub-player character 91 with respect to the specific enemy character 801, and generates a vibration command to vibrate the right controller 4 with the determined intensity.

The control unit 202 determines the vibration intensity of the right controller 4 according to the areas A11 to A13 when the sub-player character 91 is located in the hallway H. Specifically, the control unit 202 increases the vibration intensity (in the present example, the intensity is 60%) of the right controller 4, when the sub-player character 91 is located in the area A11, that is, when the sub-player character 91 is very close to the door D. When the sub-player character 91 is located in the area A12, the sub-player character 91 is closer to the door D than when the sub-player character 91 is located in the area A13. Therefore, the control unit 202 relatively increases the vibration intensity of the right controller 4 (in the present example, the intensity is 40%).

When the sub-player character 91 is located in the area A13, the sub-player character 91 is farther from the door D than when the sub-player character 91 is located in the area A12. Therefore, the control unit 202 relatively decreases the vibration intensity of the right controller 4 (in the present example, the intensity is 20%). Furthermore, when the sub-player character 91 is located outside the area A13, the sub-player character 91 is sufficiently away from the door D. Therefore, the control unit 202 does not generate the vibration command (that is, the control unit 202 determines the vibration intensity as 0).

As described above, when the door D of the room R2 where the specific enemy character 801 is located is closer to the sub-player character 91, the vibration intensity of the right controller 4 is increased. As a result, the player who operates the sub-player character 91 can recognize approaching or moving away from the room R2 where the specific enemy character 801 is located, by using a change in the vibration intensity of the right controller 4. That is, when the operation target character is located in the hallway H, the player who operates the sub-player character 91 performs the movement while estimating a room where the specific enemy character 801 is located, by using the vibration intensity. Further, the player of the sub-player character 91 communicates with the player of the player character 71, so that information of the location of the specific enemy character 801 can be shared by the two players.

If the sub-player character 91 appears after the player character 71 enters the room R2 through the door D, the control unit 202 first maintains the vibration intensity of the right controller 4 in the area A11 in the area A24 (in the present example, the intensity is 60%). In the room R2 where the specific enemy character 801 is located, if the sub-player character 91 approaches the specific enemy character 801 or the closet C where the specific enemy character 801 is hidden, the control unit 202 increases the vibration intensity of the right controller 4.

Specifically, when the sub-player character 91 is located in the area A23, the control unit 202 increases the vibration intensity more than when the sub-player character 91 is located in the area A24 (in the present example, the intensity is 80%). Furthermore, when the sub-player character 91 enters the area A22, the control unit 202 further increases the vibration intensity (in the present example, 100%). Furthermore, when the player character 71 or the sub-player character 91 enters the area A21 to be very close to the specific enemy character 801, the control unit 202 causes the specific enemy character 801 to come out of the closet C and appear on the game screen.

As such, when the specific enemy character 801 is hidden in the room R2 and the sub-player character 91 is located outside the room R2, the player first needs to specify the room where the specific enemy character 801 is hidden. For this reason, the vibration intensity is determined on the basis of the distance between the sub-player character 91 and the door D of the room R2. In the case in which the sub-player character 91 is located in the room R2 where the specific enemy character 801 is located, when the vibration intensity is determined according to the distance between the specific enemy character 801 and the sub-player character 91, the vibration may be set stronger when the sub-player character 91 faces the specific enemy character 801. In this case, the player can easily find the specific enemy character 801 by changing the orientation of the sub-player character 91 on the spot.

In the above embodiment, the right controller 4 for operating the sub-player character 91 is vibrated on the basis of the position of the sub-player character 91. However, a combination of the reference player character and the vibrating controller is not limited thereto, and any combination may be used.

For example, the right controller 4 for operating the sub-player character 91 may be vibrated on the basis of the position of the player character 71. Alternatively, the left controller 3 for operating the player character 71 may be vibrated on the basis of the position of the sub-player character 91. Alternatively, the right controller 4 for operating the sub-player character 91 may be vibrated on the basis of the position of the player character 71. In these cases, since only one of the left and right controllers vibrates, the player who uses the vibrating controller progresses the game while transmitting the presence or absence of vibration to the other player, so that the two players can progress the game while communicating with each other.

Further, both the left controller 3 and the right controller 4 may be vibrated on the basis of the position of the sub-player character 91. Alternatively, both the left controller 3 and the right controller 4 may be vibrated on the basis of the position of the player character 71. Alternatively, the left controller 3 and/or the right controller 4 may be vibrated on the basis of one of the sub-player character 91 and the player character 71 that is closer to the specific enemy character 801.

Further, when both the left controller 3 and the right controller 4 are vibrated, the vibration intensity of the left controller 3 and the vibration intensity of the right controller 4 may be varied according to the direction with respect to the specific enemy character 801 as described above. In this case, the two players transmit and combine the vibration intensities, so that the two players estimate the position or the direction of the specific enemy character 801.

<Switching of Operation Target Character>

As described above, in the one-player play mode, the control unit 202 switches between setting the player character 71 as an operation target character and the sub-player character 91 as a non-operation target character and setting the player character 71 as the non-operation target character and the sub-player character 91 as the operation target character. If an operation target switching operation is performed, the control unit 202 causes the operation target character before switching to enter a waiting state at a position immediately before switching.

Further, if the operation target switching operation is performed, the control unit 202 causes the operation target character before switching to enter a waiting state in a state in which the predetermined action performed immediately before switching is continued for at least a predetermined time. Thereby, the operation target character is caused to perform the predetermined action immediately after switching, so that the operation target character and the non-operation target character can perform the action cooperatively.

For example, with respect to the action of pulling a heavy object, the operation target is switched in a state where the operation target character is caused to perform the pulling action and a new operation target character is also caused to perform the action of pulling the same object in the same direction, so that the player character 71 and the sub-player character 91 can perform the action of pulling the object cooperatively.

The control unit 202 sets the sub-player character 91 as the operation target character immediately after the sub-player character 91 appears in the virtual space by the appearance operation in a situation where there is not the sub-player character 91. In the one-player play mode, in the case where the player character 71 appears, if the appearance operation of the sub-player character 91 is performed, the sub-player character 91 appears and the sub-player character 91 is automatically set as the operation target character. Thereafter, the switching operation is performed, so that the operation target character can be switched from the sub-player character 91 to the player character 71. Further, if the life of the sub-player character 91 that has been the operation target character is lost, the operation target character is automatically switched from the sub-player character 91 to the player character 71.

<Processing Flow>

Figure 14:
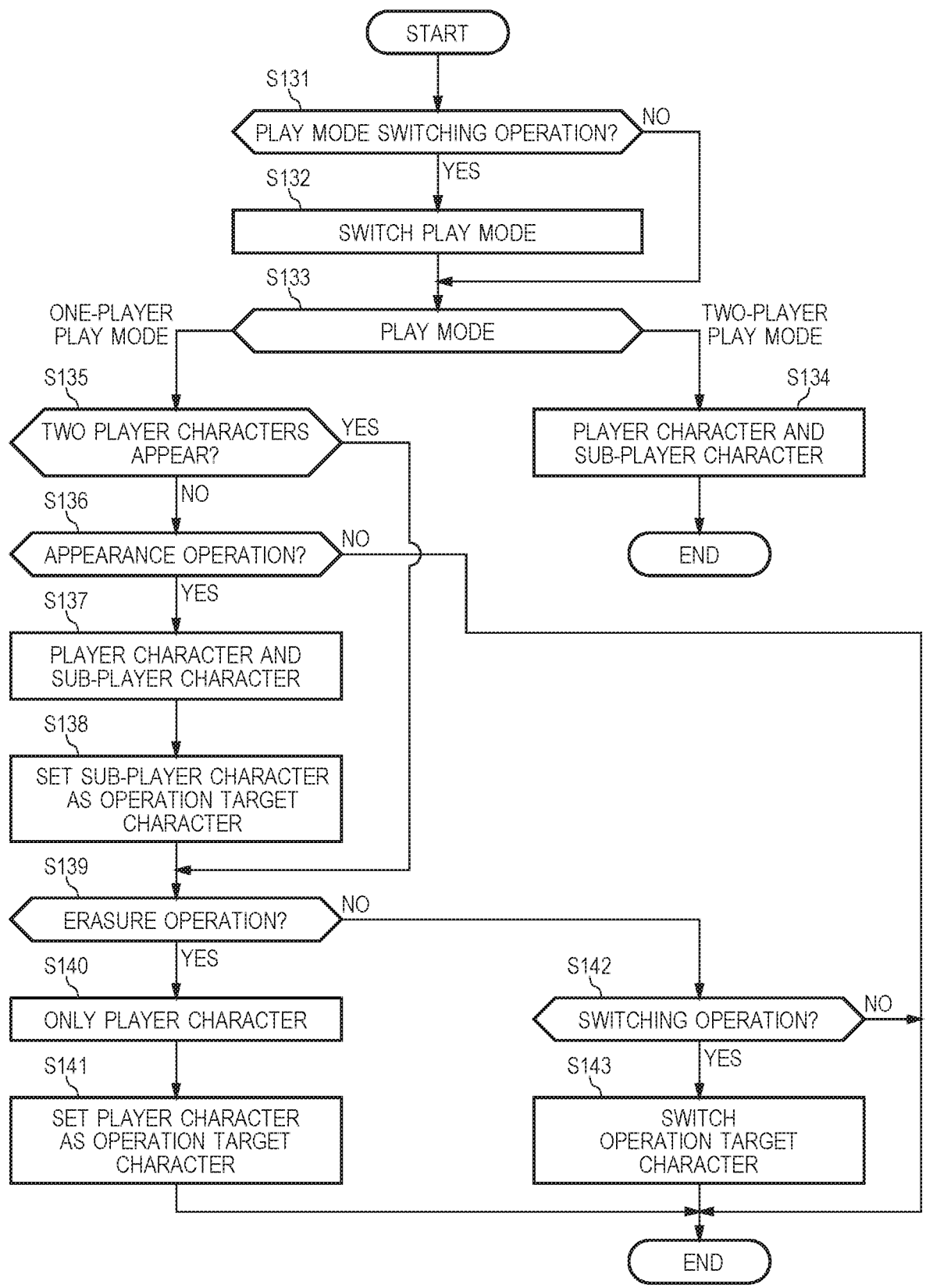
FIG. 14 is a flowchart of a game method according to the embodiment.

FIG. 14 is a flowchart of a game method according to the embodiment. The game method illustrated in the present flow is repeatedly executed in the game apparatus 2. The mode switching unit 201 of the game apparatus 2 first determines whether or not a play mode switching operation has been performed (step S131). When the play mode switching operation has not been performed ("NO" in step S131), the process skips to step S133, and when the play mode switching operation has been performed ("YES" in step S131), the mode switching unit 201 switches the play mode between the one-player play mode and the two-player play mode (step S132).

Next, the control unit 202 determines whether the play mode is the one-player play mode or the two-player play mode (step S133). When the play mode is the two-player play mode ("two-player play mode" in step S133), the control unit 202 causes the player character 71 and the sub-player character 91 to appear in the virtual space and progresses the game (step S134). As described above, at this time, the control unit 202 controls the player character 71 on the basis of the first operation data from the left controller 3, and controls the sub-player character 91 on the basis of the second operation data from the right controller 4. Note that the sub-player character 91 may be controlled by the left controller 3 and the player character 71 may be controlled by the right controller 4. Further, in the two-player play mode, the sub-player character 91 may appear automatically in the virtual space, or may appear according to an appearance instruction based on the operation data.

When the play mode is the one-player play mode ("one-player play mode" in step S133), the control unit 202 determines whether or not both the player character 71 and the sub-player character 91 appear in the virtual space (step S135). When only the player character 71 is located in the virtual space (NO in step S135), the control unit 202 determines whether or not an appearance operation has been performed (step S136). When the appearance operation has not been performed ("NO" in step S136), the control unit 202 progresses the game by the player character 71, and ends the processing. When the appearance operation has been performed ("YES" in step S136), the control unit 202 causes the sub-player character 91 to appear in the virtual space in addition to the player character 71 (step S137), and sets the sub-player character 91 as the operation target character and progresses the game (step S138).

After the sub-player character 91 appears (step S138) or when the player character 71 and the sub-player character 91 are already located in the virtual space ("YES" in step S135), the control unit 202 determines whether or not an erasure operation has been performed (step S139). When the erasure operation has not been performed ("NO" in step S139), the process skips to step S142, and when the erasure operation has been performed ("YES" in step S139), the control unit 202 temporarily erases the sub-player character 91 from the virtual space (step S140), sets the player character 71 as the operation target object, and progresses the game by the player character 71 (step S141).

When the erasure operation has not been performed ("NO" in step S139), the control unit 202 determines whether or not a switching operation for switching the operation target character has been performed (step S142). When the switching operation has not been performed ("NO" in step S142), the control unit 202 progresses the game, and when the switching operation has been performed ("YES" in step S142), the control unit 202 switches the operation target character between the player character 71 and the sub-player character 91 (step S143), and progresses the game.

As described above, in the game according to the present embodiment, the play mode can be changed at arbitrary timing during the progress of the game, the sub-player character 91 can be caused to appear and erased at arbitrary timing during playing a game in the one-player play mode, and the operation target character can be switched between the player character 71 and the sub-player character 91 at arbitrary timing when the sub-player character 91 appears.

Figure 15:
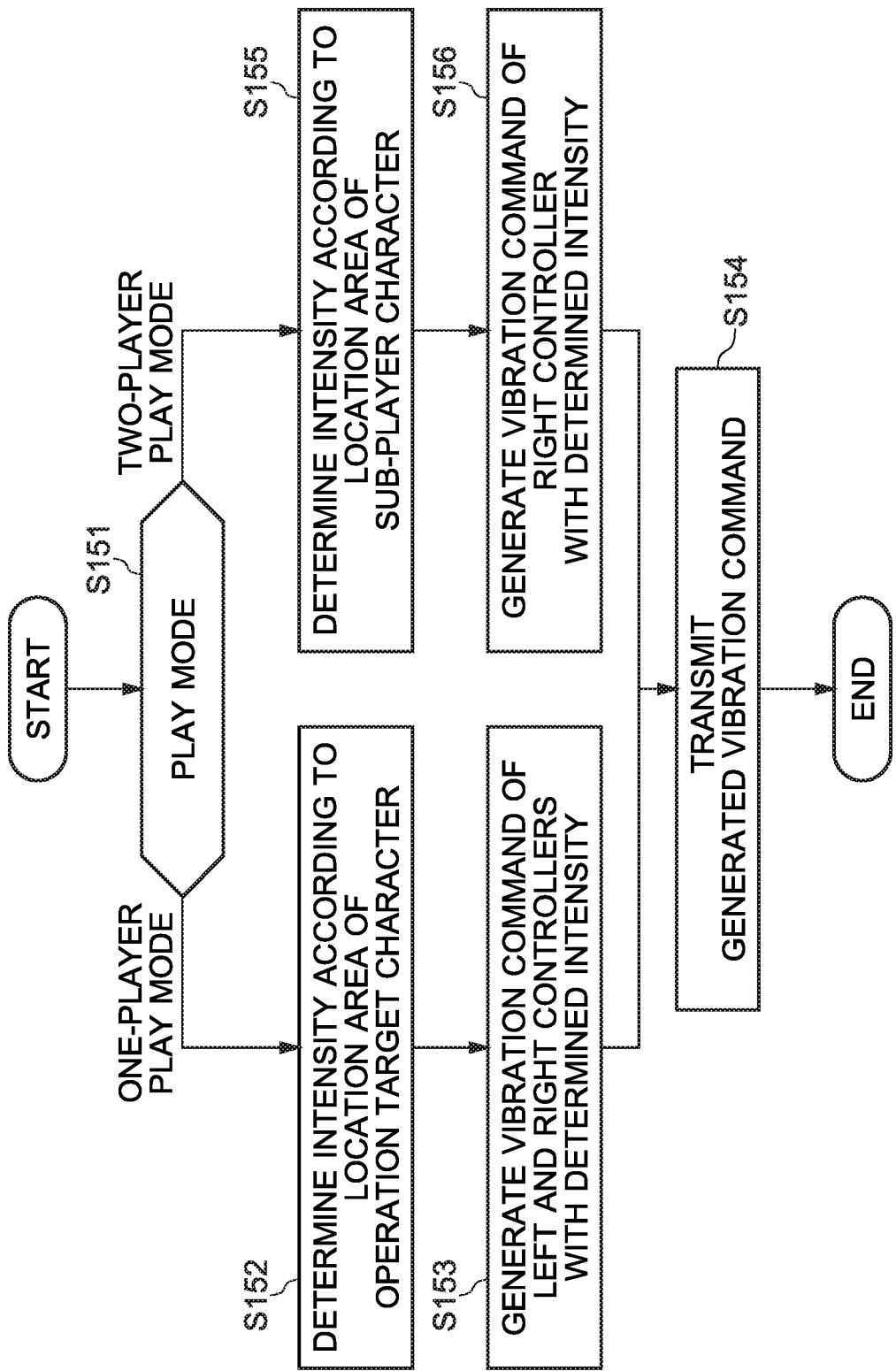
FIG. 15 is a flowchart of processing for generating a vibration according to the embodiment.

FIG. 15 is a flowchart of processing for generating a vibration according to the embodiment. The vibration processing illustrated in the present flow is repeatedly executed in the game apparatus 2. The control unit 202 first determines whether the play mode is the one-player play mode or the two-player play mode (step S151). When the play mode is the one-player play mode ("one-player play mode" in step S151), the control unit 202 determines the vibration intensity according to which area the operation target character in the virtual space is located in for vibrating the controller (step S152).

The control unit 202 generates a vibration command for vibrating the left controller 3 and the right controller 4 with the determined intensity (step S153), and the transmission/reception unit 203 transmits the vibration command to the left controller 3 and the right controller 4 (step S154).

When the play mode is the two-player play mode ("two-player play mode" in step S151), the control unit 202 determines the vibration intensity of the right controller 4 according to which area the sub-player character 91 in the virtual space is located in for vibrating the controller (step S155). The control unit 202 generates a vibration command for vibrating the right controller 4 with the determined intensity (step S156), and the transmission/reception unit 203 transmits the vibration command to the right controller 4 (step S154).

As described above, the game apparatus 2 determines the intensity for vibrating the controller, depending on which area set on the basis of the specific enemy character 801 the operation target character (in the case of the one-player play mode) or the sub-player character (in the case of the two-player play mode) is located in, in other words, according to a position relation between the specific enemy character 801 and the operation target character or the sub-player character. Therefore, the player can predict the position of the specific enemy character 801, on the basis of the presence or absence of the vibration of the controller and the vibration intensity.

In the one-player play mode, only the left controller 3 may be vibrated when the operation target character is located on the right side of the specific enemy character 801, and only the right controller 4 may be vibrated when the operation target character is located on the left side of the specific enemy character 801. Alternatively, when the operation target character is located on the right side of the specific enemy character 801, the vibration intensity of the left controller 3 may be caused to be larger than the vibration intensity of the right controller 4, and when the operation target character is located on the left side of the specific enemy character 801, the vibration intensity of the right controller 4 may be caused to be larger than the vibration intensity of the left controller 3. In this way, the player can recognize not only that the specific enemy character 801 is located nearby but also the direction in which the specific enemy character 801 is located.

As described above, according to the game system 1 of the present embodiment, in the one-player play mode in which one player plays a game, any one of the player character 71 and the sub-player character 91 is set as an operation target and controlled. In the two-player play mode in which two players play a game, the player character 71 is operated by the left controller 3 and the sub-player character 91 is operated by the right controller 4. Therefore, a plurality of player characters can be operated in both the one-player play mode and the two-player play mode. Further, in the two-player play mode, a plurality of player characters can play a game cooperatively.

In the above embodiment, in the one-player play mode, a game can be played by using a two-handed controller with a function of exchanging the operation data, the vibration command, or the like with the game apparatus 2 via wired communication or wireless communication, instead of the left controller 3 and the right controller 4 separated from each other in the above embodiment. Furthermore, in the one-player play mode, the left controller 3 and the right controller 4 may be integrated into a two-handed controller using one attachment to which the left controller 3 and the right controller 4 are attached.

Further, in the above embodiment, an example in which the two players play a game using the left controller 3 and the right controller 4 one by one has been described as the two-player play mode. However, the two-player play mode is not limited thereto, and a plurality of players may play a game using two left controllers 3, two right controllers 4, or three or more controllers. Further, in the two-player play mode, a game can be played by using a plurality of game apparatuses 2 and the local communication described above.

Further, in the above embodiment, the game system is configured by executing the game program according to the embodiment by the game apparatus 2. However, the apparatus that executes the game program according to the embodiment may not be an apparatus dedicated to the game, and may be an information processing apparatus having an information processing function other than the game and mainly used for general purpose or other purposes.

Further, when the sub-player character 91 is "erased" from the virtual space, it is not necessary to completely erase the sub-player character 91 from the game screen, and the sub-player character 91 may be displayed on the game screen in a format that does not affect the progress of the game. In the above embodiment, it can be said that the sub-player character 91 becomes a liquid by the erasure operation, moves to the tank 74 of the vacuum cleaner 72 of the player character 71, and is displayed on the screen in the form of the liquid. However, this state is also called "erasure".

What is claimed is:

1. A non-transitory storage medium having stored therein a game program for causing a computer of an information processing apparatus to provide execution comprising:
    acquiring first operation data from a first controller and second operation data from a second controller;
    switching a play mode between a first mode in which one player plays a game and a second mode in which two players play the game, on a basis of at least one of the first operation data and the second operation data;
    for a first player character and a second player character in a virtual space:
        switching an operation target to be controlled between the first player character and the second player character on the basis of at least one of the first operation data and the second operation data and control the operation target on the basis of at least one of the first operation data and the second operation data, in the first mode; and
        controlling the first player character on the basis of the first operation data and control the second player character on the basis of the second operation data, in the second mode, wherein
    the one player can control the first player character or the second player character in the first mode using the first controller and the second controller,
    in the first mode, the first controller is configured to be held by the one player in one hand, and the second controller is configured to be held by the one player in another hand,
    in the second mode, the first controller is configured to be held by one player, of the two players, in both hands, and the second controller is configured to be held by another player, of the two players, in both hands,
    the first controller and the second controller are configured to vibrate,
    in the first mode, the first controller and/or the second controller vibrate when the second player character is in a state of not being visible in the virtual space, and
    in the second mode, the first controller and/or the second controller vibrate when a second player operates the second player character.

2. The non-transitory storage medium according to claim 1,
    wherein the first controller includes a first vibrator,
    the second controller includes a second vibrator, and the game program further causes the computer to provide execution comprising:
   generating a signal to vibrate the first vibrator and/or the second vibrator, on a basis of a position of the first player character or the second player character to be the operation target with respect to a predetermined object in the virtual space, in the first mode; and
   generating a signal to vibrate the first vibrator and/or the second vibrator, on a basis of a position of at least one of the first player character and the second player character with respect to the predetermined object, in the second mode.

3. The non-transitory storage medium according to claim 1,
wherein the first controller includes a first vibrator,
the second controller includes a second vibrator, and
the game program further causes the computer to provide execution comprising:
   determining at least one of an intensity to vibrate the first vibrator and an intensity to vibrate the second vibrator, on a basis of a position of the first player character or the second player character to be the operation target with respect to a predetermined object in the virtual space, and generating a signal to vibrate the first vibrator and/or the second vibrator with the determined intensity, in the first mode; and
   determining an intensity to vibrate at least one of the first vibrator and the second vibrator, on a basis of a position of at least one of the first player character and the second player character with respect to the predetermined object, and generating a signal to vibrate the first vibrator and/or the second vibrator with the determined intensity, in the second mode.

4. The non-transitory storage medium according to claim 3,
wherein the game program, in the second mode, further causes the computer to provide execution comprising determining an intensity to vibrate the second vibrator, on a basis of a distance between the predetermined object and the second player character, and generating a signal to vibrate the second vibrator with the determined intensity.

5. The non-transitory storage medium according to claim 1, wherein
the first player character is controlled as the operation target, and the second player character, operating without being controlled as a non-operation target, enters a waiting state on a spot in the virtual space, and
the second player character is controlled as the operation target, and the first player character, operating without being controlled as the non-operation target, enters the waiting state on the spot in the virtual space.

6. The non-transitory storage medium according to claim 1, wherein a characteristic associated with the virtual space affects the first player character differently than the second player character.

7. The non-transitory storage medium according to claim 1, wherein the first player character and the second player character have different accessible ranges in the virtual space.

8. The non-transitory storage medium according to claim 1,
wherein the game program, in the first mode, further causes the computer to provide execution comprising:
   performing control for causing the second player character to enter a waiting state in the virtual space, performing control for temporarily erasing the second player character, or performing control for causing the erased second player character to reappear, when the first player character is controlled; and
   performing control for causing the first player character to enter a waiting state in the virtual space, when the second player character is controlled.

9. The non-transitory storage medium according to claim 8, wherein the game program further causes the computer to provide execution comprising performing control for causing the first player character or the second player character to enter a waiting state at a position immediately before the switching of the operation target, when the first player character or the second player character is caused to enter a waiting state.

10. The non-transitory storage medium according to claim 9, wherein the game program further causes the computer to provide execution comprising performing control for causing the first player character or the second player character to enter a waiting state in a state in which a predetermined action performed immediately before the switching of the operation target is performed, when the first player character or the second player character is caused to enter a waiting state.

11. A game apparatus, comprising:
a processor; and
a memory configured to store computer readable instructions that, when executed by the processor, cause the game apparatus to:
   acquire first operation data from a first controller and second operation data from a second controller;
   switch a play mode between a first mode in which one player plays a game and a second mode in which two players play the game, on a basis of at least one of the first operation data and the second operation data; and
   control a first player character and a second player character in a virtual space,
wherein the game apparatus is configured to:
   switch an operation target to be controlled between the first player character and the second player character is set as an operation target, on the basis of the first operation data and the second operation data and control the operation target on the basis of at least one of the first operation data and the second operation data, in the first mode, and
   control the first player character on the basis of the first operation data and control the second player character on the basis of the second operation data, in the second mode, wherein
the first controller and the second controller are configured to vibrate,
in the first mode, the first controller and/or the second controller vibrate when the second player character is in a state of not being visible in the virtual space, and
in the second mode, the first controller and/or the second controller vibrate when a second player operates the second player character.

12. The game apparatus according to claim 11,
wherein the first controller includes a first vibrator,
the second controller includes a second vibrator, and
the game apparatus is further configured to:
   generate a signal to vibrate the first vibrator and/or the second vibrator, on a basis of a position of the first player character or the second player character to be the operation target with respect to a predetermined object in the virtual space, in the first mode, and generate a signal to vibrate the first vibrator and/or the second vibrator, on a basis of a position of at least one of the first player character and the second player character with respect to the predetermined object, in the second mode.

13. The game apparatus according to claim 11, wherein the first controller includes a first vibrator, the second controller includes a second vibrator, and the game apparatus is further configured to:
    determine at least one of an intensity to vibrate the first vibrator and an intensity to vibrate the second vibrator, on a basis of a position of the first player character or the second player character to be the operation target with respect to a predetermined object in the virtual space, and generate a signal to vibrate the first vibrator and/or the second vibrator with the determined intensity, in the first mode, and to determine an intensity to vibrate at least one of the first vibrator and the second vibrator, on a basis of a position of at least one of the first player character and the second player character with respect to the predetermined object, and
    generate a signal to vibrate the first vibrator and/or the second vibrator with the determined intensity, in the second mode.

14. The game apparatus according to claim 11, wherein the game apparatus is further configured to, in the first mode,
    cause the second player character to enter a waiting state in the virtual space, temporarily erase the second player character, or cause the erased second player character to reappear, when the first player character is controlled, and
    cause the first player character to enter a waiting state in the virtual space, when the second player character is controlled.

15. A game system, comprising:
    a first controller configured to generate first operation data according to an operation of a user;
    a second controller configured to generate second operation data according to an operation of the user; and
    processing circuitry having at least one processor, the processing circuitry is configured to:
        switch a play mode between a first mode in which one player plays a game and a second mode in which two players play the game, on a basis of at least one of the first operation data and the second operation data;
        control a first player character and a second player character in a virtual space;
        switch an operation target to be controlled between the first player character and the second player character is set as an operation target, on the basis of the first operation data and the second operation data and control the operation target on the basis of at least one of the first operation data and the second operation data, in the first mode; and
        control the first player character on the basis of the first operation data and control the second player character on the basis of the second operation data, in the second mode, wherein
    the first controller and the second controller are configured to vibrate,
    in the first mode, the first controller and/or the second controller vibrate when the second player character is in a state of not being visible in the virtual space, and
    in the second mode, the first controller and/or the second controller vibrate when a second player operates the second player character.

16. The game system according to claim 15, wherein the first controller includes a first vibrator, the second controller includes a second vibrator, and the processing circuitry is further configured to:
    generate a signal to vibrate the first vibrator and/or the second vibrator, on a basis of a position of the first player character or the second player character to be the operation target with respect to a predetermined object in the virtual space, in the first mode, and
    generate a signal to vibrate the first vibrator and/or the second vibrator, on a basis of a position of at least one of the first player character and the second player character with respect to the predetermined object, in the second mode.

17. The game system according to claim 15, wherein the first controller includes a first vibrator, the second controller includes a second vibrator, and the processing circuitry is further configured to:
    determine at least one of an intensity to vibrate the first vibrator and an intensity to vibrate the second vibrator, on a basis of a position of the first player character or the second player character to be the operation target with respect to a predetermined object in the virtual space, and generate a signal to vibrate the first vibrator and/or the second vibrator with the determined intensity, in the first mode, and
    determine an intensity to vibrate at least one of the first vibrator and the second vibrator, a the basis of a position of at least one of the first player character and the second player character with respect to the predetermined object, and generate a signal to vibrate the first vibrator and/or the second vibrator with the determined intensity, in the second mode.

18. The game system according to claim 15, wherein the processing circuitry is further configured to, in the first mode,
    cause the second player character to enter a waiting state in the virtual space, temporarily erase the second player character, or cause the erased second player character to reappear, when the first player character is controlled, and
    cause the first player character to enter a waiting state in the virtual space, when the second player character is controlled.

19. A game method executed in a computer of an information processing apparatus, the game method comprising:
    acquiring first operation data from a first controller;
    acquiring second operation data from a second controller;
    switching a play mode between a first mode in which one player plays a game and a second mode in which two players play the game, on a basis of at least one of the first operation data and the second operation data;
    for a first player character and a second player character in a virtual space:
        switching an operation target to be controlled between the first player character and the second player character is set as an operation target, on the basis of at least one of the first operation data and the second operation data and controlling the operation target on the basis of at least one of the first operation data and the second operation data, in the first mode; and
        controlling the first player character on the basis of the first operation data and controlling the second player character on the basis of the second operation data, in the second mode, wherein the first controller and the second controller are configured to vibrate, in the first mode, the first controller and/or the second controller vibrate when the second player character is in a state of not being visible in the virtual space, and in the second mode, the first controller and/or the second controller vibrate when a second player operates the second player character.

20. The game method according to claim 19, wherein the first controller includes a first vibrator, the second controller includes a second vibrator, and the game method further comprises:

generating a signal to vibrate the first vibrator and/or the second vibrator, on a basis of a position of the first player character or the second player character to be the operation target with respect to a predetermined object in the virtual space, in the first mode; and generating a signal to vibrate the first vibrator and/or the second vibrator, on a basis of a position of at least one of the first player character and the second player character with respect to the predetermined object, in the second mode.

21. The game method according to claim 19, wherein the first controller includes a first vibrator, the second controller includes a second vibrator, and the game method further comprises:

determining at least one of an intensity to vibrate the first vibrator and an intensity to vibrate the second vibrator, on a basis of a position of the first player character or the second player character to be the operation target with respect to a predetermined object in the virtual space, and generating a signal to vibrate the first vibrator and/or the second vibrator with the determined intensity, in the first mode; and determining an intensity to vibrate at least one of the first vibrator and the second vibrator, on a basis of a position of at least one of the first player character and the second player character with respect to the predetermined object, and generating a signal to vibrate the first vibrator and/or the second vibrator with the determined intensity, in the second mode.

22. The game method according to claim 19, further comprising:

causing the second player character to enter a waiting state in the virtual space, temporarily erasing the second player character, or causing the erased second player character to reappear, when the first player character is controlled; and causing the first player character to enter a waiting state in the virtual space, when the second player character is controlled, in the first mode.

* * * * *